(12) United States Patent
Pourreza Shahri et al.

(10) Patent No.: US 10,708,525 B2
(45) Date of Patent: Jul. 7, 2020

(54) SYSTEMS AND METHODS FOR PROCESSING LOW LIGHT IMAGES

(71) Applicant: QUALCOMM Incorporated, San Diego, CA (US)

(72) Inventors: Reza Pourreza Shahri, San Diego, CA (US); Mona Fathollahi Ghezelghieh, Irvine, CA (US); Ramin Rezaiifar, Del Mar, CA (US); Donna Roy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/114,079

(22) Filed: Aug. 27, 2018

(65) Prior Publication Data

US 2020/0068151 A1 Feb. 27, 2020

(51) Int. Cl.
| | | |
|---|---|---|
| H04N 5/235 | (2006.01) | |
| H04N 9/77 | (2006.01) | |
| H04N 5/355 | (2011.01) | |
| G06T 3/00 | (2006.01) | |
| G06T 5/00 | (2006.01) | |

(52) U.S. Cl.
CPC ....... *H04N 5/35581* (2013.01); *G06T 3/0006* (2013.01); *G06T 5/002* (2013.01); *H04N 5/2353* (2013.01); *H04N 5/2355* (2013.01); *H04N 9/77* (2013.01)

(58) Field of Classification Search
CPC .... H04N 5/35581; H04N 5/2353; H04N 9/77; H04N 5/2355; G06T 3/0006; G06T 5/002
See application file for complete search history.

(56) References Cited

U.S. PATENT DOCUMENTS

| | | | |
|---|---|---|---|
| 7,548,689 B2 | 6/2009 | Yap et al. | |
| 8,977,073 B2 | 3/2015 | Kwon et al. | |
| 9,040,892 B2 | 5/2015 | Smith | |
| 9,131,201 B1 | 9/2015 | Geiss | |
| 9,307,161 B2 | 4/2016 | Lee et al. | |
| 2015/0195464 A1* | 7/2015 | Sharma | H04N 5/3537 348/217.1 |
| 2015/0312503 A1* | 10/2015 | Sato | H03M 7/3062 348/308 |
| 2015/0348242 A1* | 12/2015 | Molgaard | G06T 11/60 348/241 |
| 2017/0289515 A1* | 10/2017 | Li | H04N 5/2354 |
| 2018/0293710 A1 | 10/2018 | Meyer et al. | |

* cited by examiner

*Primary Examiner* — Hung H Lam
(74) *Attorney, Agent, or Firm* — Polsinelli LLP

(57) ABSTRACT

Techniques and systems are provided for processing one or more low light images. For example, a short exposure image associated with one or more shutter speeds can be obtained. A long exposure image is also obtained, which is captured using a slower shutter speed than the one or more shutter speeds associated with the short exposure image. An output image can be generated by mapping color information from the long exposure image to the short exposure image.

30 Claims, 14 Drawing Sheets
(6 of 14 Drawing Sheet(s) Filed in Color)

303a

303a

303a

404

506

708

1100

OBTAIN ONE OR MORE SHORT EXPOSURE IMAGES, THE ONE OR MORE SHORT EXPOSURE IMAGES BEING CAPTURED USING ONE OR MORE SHUTTER SPEEDS
1102

GENERATE A NOISE-REDUCED SHORT EXPOSURE IMAGE FROM THE ONE OR MORE SHORT EXPOSURE IMAGES
1104

OBTAIN A LONG EXPOSURE IMAGE, THE LONG EXPOSURE IMAGE BEING CAPTURED USING A SLOWER SHUTTER SPEED THAN THE ONE OR MORE SHUTTER SPEEDS USED TO CAPTURE THE ONE OR MORE SHORT EXPOSURE IMAGES
1106

GENERATE AN OUTPUT IMAGE, WHEREIN GENERATING THE OUTPUT IMAGE INCLUDES MAPPING COLOR INFORMATION FROM THE LONG EXPOSURE IMAGE TO THE NOISE-REDUCED SHORT EXPOSURE IMAGE
1108

FIG. 11

SYSTEMS AND METHODS FOR PROCESSING LOW LIGHT IMAGES

FIELD

The present disclosure generally relates to techniques and systems for processing low light images.

BACKGROUND

Many devices and systems allow a scene to be captured by generating image and/or video data of the scene. For example, a camera can be used to capture images of a scene for recreational use, for professional photography, for surveillance, among other applications. The image data from image capture devices and systems can be captured and output for processing and/or consumption.

Low light images are images that are captured with very little light. Taking high quality images with low light conditions is very challenging. For example, low light images are typically noisy, dark, and void of some or all color. The noise can cause a low light image to look grainy. Increasing the exposure time for the camera can help to increase the amount of light that the image sensor is exposed to, but can lead to a blurry image. Effective techniques are needed for processing low light images so that a high quality image can be output.

BRIEF SUMMARY

In some examples, techniques and systems are described for processing low light images and generating output images that have improved noise, brightness, and color characteristics as compared to the low light images. Short exposure images and long exposure images can be processed together to generate the output images. For instance, the sharpness of a short exposure image can be used in combination with the color-preserving nature of a long exposure image in order to generate an output image that has a bright and colorful appearance, with little to no noise.

For example, an image processing system can receive one or more short exposure images of a scene that has low light, and can also receive a long exposure image of the same low light scene. When multiple short exposure images are received, the short exposure images can be combined into a single short exposure image. In one illustrative example, the multiple short exposure images can be averaged to generate an averaged short exposure image. In some cases, a denoising engine can remove noise from a short exposure image (e.g., the captured short exposure image or a combination of captured short exposure images when multiple short exposure images are captured), resulting in a noise-reduced image. The short and long exposure images can be processed so that the color information from the long exposure image is mapped to a short exposure image (e.g., the captured short exposure image, a combination of captured short exposure images, or a noise-reduced short exposure image).

In some examples, an affine transform can be applied to map the color information from the long exposure image to the short exposure image. A data structure (e.g., a tensor, a grid, a matrix, or other data structure) can be generated that includes information associated with the short and long exposure images. In one illustrative example, a three-dimensional (3D) tensor can be generated, with each cell of the tensor including first and second moments of the color components (e.g., red (R), green (G), and blue (B) for RGB images) of the pixels in each of the short and long exposure images. In some cases, the first moment can include a mean or average, and the second moment can include a variance or standard deviation. In some cases, a filter can be applied to the data structure before the color matching is performed. For instance, in the case of a 3D tensor, a 3D filter can be applied to the 3D tensor. The affine transform can then be applied, using the information from the data structure, to map the color information from the pixels of the long exposure image to the pixels of the short exposure image. In one illustrative example, if mean and variance (or standard deviation) are used as the first and second moments, the affine transform can include a mean-variance matching process.

According to at least one example, a method of processing one or more low light images is provided. The method includes obtaining a short exposure image. The short exposure image is associated with one or more shutter speeds. The method further includes obtaining a long exposure image. The long exposure image is captured using a slower shutter speed than the one or more shutter speeds associated with the short exposure image. The method further includes generating an output image. Generating the output image includes mapping color information from the long exposure image to the short exposure image.

In another example, an apparatus for processing one or more low light images is provided that includes a memory configured to store data corresponding to one or more short exposure images and data corresponding to one or more long exposure images. The processor is configured to and can obtain a short exposure image. The short exposure image is associated with one or more shutter speeds. The processor is configured to and can obtain a long exposure image. The long exposure image is captured using a slower shutter speed than the one or more shutter speeds associated with the short exposure image. The processor is configured to and can generate an output image. Generating the output image includes mapping color information from the long exposure image to the short exposure image.

In another example, a non-transitory computer-readable medium is provided that has stored thereon instructions that, when executed by one or more processors, cause the one or more processor to: obtain a short exposure image, the short exposure image being associated with one or more shutter speeds; obtain a long exposure image, the long exposure image being captured using a slower shutter speed than the one or more shutter speeds associated with the short exposure image; and generate an output image, wherein generating the output image includes mapping color information from the long exposure image to the short exposure image.

In another example, an apparatus for processing one or more low light images is provided. The apparatus includes means for obtaining a short exposure image. The short exposure image is associated with one or more shutter speeds. The apparatus further includes means for obtaining a long exposure image. The long exposure image is captured using a slower shutter speed than the one or more shutter speeds associated with the short exposure image. The apparatus further includes means for generating an output image. Generating the output image includes mapping color information from the long exposure image to the short exposure image.

In some aspects, mapping the color information from the long exposure image to the short exposure image includes applying an affine transform to the short exposure image. The affine transform can map one or more color moments between the long exposure image and the short exposure image. The one or more color moments can be included in a three-dimensional tensor.

In some aspects, the methods, apparatuses, and computer-readable medium described above further comprise applying one or more three-dimensional filters to the three-dimensional tensor.

In some aspects, the affine transform includes mean-variance matching. In such aspects, the one or more color moments can include a mean and a variance of pixels from the short exposure image and a mean and a variance of pixels from the long exposure image.

In some aspects, the methods, apparatuses, and computer-readable medium described above further comprise generating the three-dimensional tensor. The three-dimensional tensor includes a plurality of cells, with each cell including at least one mean of a group of pixels from the short exposure image, at least one standard deviation of the group of pixels from the short exposure image, at least one mean of a group of pixels from the long exposure image, and at least one standard deviation of the group of pixels from the long exposure image. In some cases, the three-dimensional tensor includes a plurality of layers of cells, where each layer of the three-dimensional tensor corresponds to a different range of luminance values.

In some aspects, the short exposure image is an image captured using a shutter speed.

In some aspects, the short exposure image is a noise-reduced short exposure image generated from one or more short exposure images captured using the one or more shutter speeds. In such aspects, generating the output image includes mapping the color information from the long exposure image to the noise-reduced short exposure image. In some aspects, the methods, apparatuses, and computer-readable medium described above further comprise generating the noise-reduced short exposure image. Generating the noise-reduced short exposure image can include processing the one or more short exposure images using a neural network trained to remove noise from the one or more short exposure images.

In some aspects, the methods, apparatuses, and computer-readable medium described above further comprise: receiving a plurality of short exposure images captured using the one or more shutter speeds; and generating an averaged short exposure image. Generating the averaged short exposure image can include averaging pixels from the plurality of short exposure images. In some aspects, the short exposure image is a noise-reduced short exposure image generated from the averaged short exposure image. In such aspects, generating the output image includes mapping the color information from the long exposure image to the noise-reduced short exposure image. In some aspects, the methods, apparatuses, and computer-readable medium described above further comprise generating the noise-reduced short exposure image. Generating the noise-reduced short exposure image can include processing the averaged short exposure image using a neural network trained to remove noise from the averaged short exposure image.

According to at least one other example, a method of processing one or more low light images is provided that includes obtaining one or more short exposure images. The one or more short exposure images are captured using one or more shutter speeds. The method further includes generating a noise-reduced short exposure image from the one or more short exposure images, and obtaining a long exposure image. The long exposure image is captured using a slower shutter speed than the one or more shutter speeds used to capture the one or more short exposure images. The method further includes generating an output image. Generating the output image can include mapping color information and luminance information from the long exposure image to the noise-reduced short exposure image.

In another example, an apparatus for processing one or more low light images is provided that includes a memory configured to store data corresponding to one or more short exposure images and data corresponding to one or more long exposure images. The processor is configured to and can obtain one or more short exposure images. The one or more short exposure images are captured using one or more shutter speeds. The processor is further configured to and can generate a noise-reduced short exposure image from the one or more short exposure images, and obtain a long exposure image. The long exposure image is captured using a slower shutter speed than the one or more shutter speeds used to capture the one or more short exposure images. The processor is further configured to and can generating an output image. Generating the output image can include mapping color information and luminance information from the long exposure image to the noise-reduced short exposure image.

In another example, a non-transitory computer-readable medium is provided that has stored thereon instructions that, when executed by one or more processors, cause the one or more processor to: obtain one or more short exposure images, the one or more short exposure images being captured using one or more shutter speeds; generate a noise-reduced short exposure image from the one or more short exposure images; obtain a long exposure image, the long exposure image being captured using a slower shutter speed than the one or more shutter speeds used to capture the one or more short exposure images; and generate an output image, wherein generating the output image includes mapping color information and luminance information from the long exposure image to the noise-reduced short exposure image.

In another example, an apparatus for processing one or more low light images is provided. The apparatus includes means for obtaining one or more short exposure images. The one or more short exposure images are captured using one or more shutter speeds. The apparatus further includes means for generating a noise-reduced short exposure image from the one or more short exposure images, and means for obtaining a long exposure image. The long exposure image is captured using a slower shutter speed than the one or more shutter speeds used to capture the one or more short exposure images. The apparatus further includes means for generating an output image. Generating the output image can include mapping color information and luminance information from the long exposure image to the noise-reduced short exposure image.

In some aspects, the apparatuses described above can comprise a mobile device. In some cases, the apparatuses can include one or more cameras for capturing the one or more short exposure images and the one or more long exposure images. In some cases, the apparatuses can include a display for displaying the output image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The patent or application file contains at least one drawing executed in color. Copies of this patent or patent application with color drawing(s) will be provided by the Office by request and payment of the necessary fee. Illustrative embodiments of the present application are described in detail below with reference to the following drawing figures:

FIG. 11 is a flowchart illustrating another example of a process for processing one or more low light images, in accordance with some examples;

DETAILED DESCRIPTION

Figure 1:
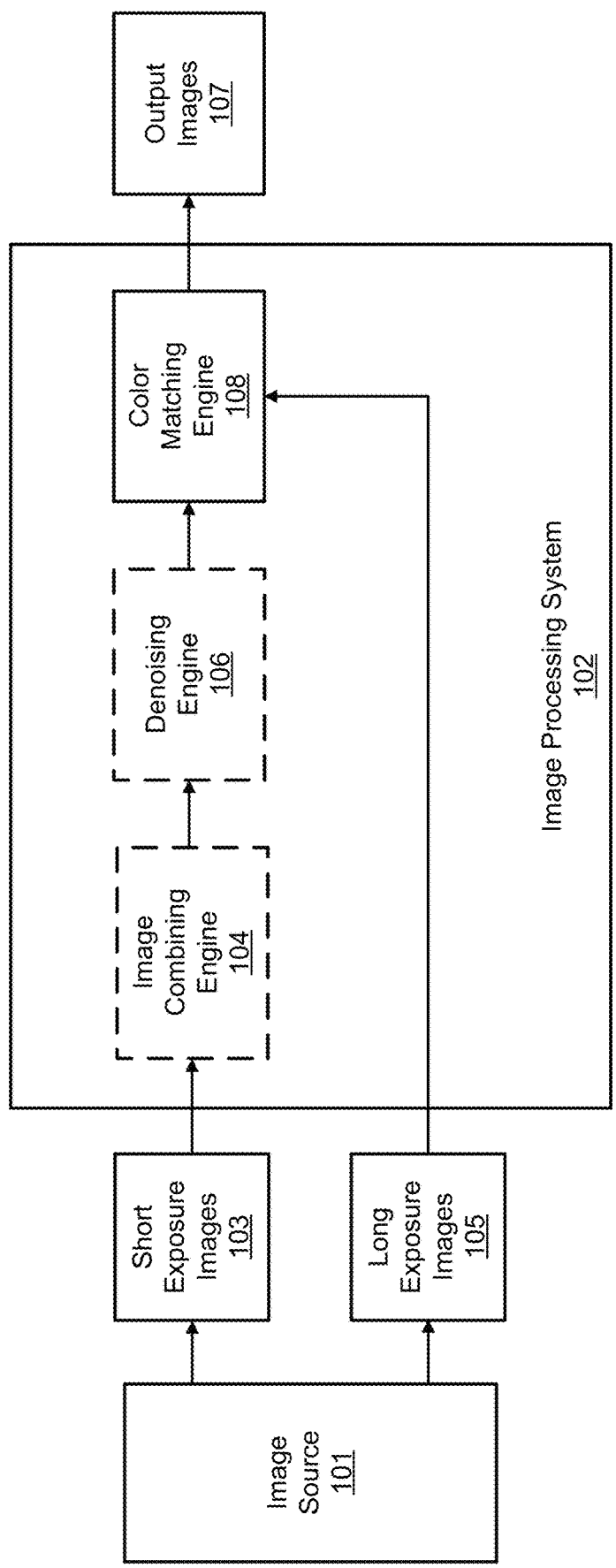
FIG. 1 is a block diagram illustrating an example of an image processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Low light images are images captured of a scene having little to no light. Taking high quality pictures of scenes with low light conditions is very challenging. For example, low light images are typically noisy, dark, and void of color. The noise in a low light image is a manifestation of random variation of brightness and/or color information that is caused by the low light condition. The result of the noise is that a low light image appears grainy. In some cases, the exposure time for a camera can be increased to help increase the amount of light that is exposed to the image sensor. However, a longer exposure time can lead to a blurry image, due to more light hitting the camera sensor during a shutter operation.

Systems, methods, and computer-readable media are described herein for processing low light images to generate output images. The output images have improved noise, brightness, and color characteristics as compared to the low light images. For instance, an image processing system can process one or more short exposure images and one or more long exposure images of a scene in order to generate a high quality output image of the scene. A short exposure image provides sharp (in-focus) details, while a long exposure image preserves color and brightness of the scene. As described in more detail herein, the image processing system can generate an output image by mapping the color information from a long exposure image of the scene to a short exposure image of the scene. In some cases, the color and brightness (also referred to as luminance) information from a long exposure image are mapped to a short exposure image using the techniques described herein. For example, in the red-green-blue (RGB) color space, the brightness is encompassed by the RGB values. In the luma, chroma blue, chroma red (YCbCr) color space, the luma and chroma components are separated.

FIG. 1 is a diagram illustrating an example of an image processing system 102. The image processing system 102 includes various components, including an image combining engine 104, a denoising engine 106, and a color matching engine 108. The image combining engine 104 and the denoising engine 106 are optional components (as indicated by the dotted outlines). For example, in some cases, one or more both of the image combining engine 104 and the denoising engine 106 can be included in or used by the image processing system 102, and in other cases can be omitted from or not used by the image processing system 102. The components of the image processing system 102 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein. While the image processing system 102 is shown to include certain components, one of ordinary skill will appreciate that the image processing system 102 can include more or fewer components than those shown in FIG. 1. For example, the image processing system 102 may also include, in some instances, one or more memory devices (e.g., RAM, ROM, cache, buffer, and/or the like) and/or processing devices that are not shown in FIG. 1.

In some examples, the low light image processing techniques described herein can be performed in response to one or more low light images being captured by a camera or a computing device that includes a camera (e.g., a mobile device, or the like), where the low light processing can be automatically or manually selected for application to the captured images. In some illustrative examples, the low light image processing can be invoked in response to selection of a shutter button, one or more graphical icons that cause an image to be processed for low light conditions upon being captured, and/or other selection option of a camera or computing device.

The image processing system 200 can receive as input short exposure images 101 and long exposure images 105 from an image source 101, and can process the images to generate output images 107. The input images can include still images or individual video frames of a video sequence. Video frames can also be referred to herein as video pictures or pictures. A short exposure image and/or a long exposure image can be a red-green-blue (RGB) image having red, green, and blue color components per pixel, a luma, chroma-red, chroma-blue (YCbCr) image having a luma component and two chroma (color) components (chroma-red and chroma-blue) per pixel, or any other suitable type of color or monochrome image. The image source 101 from which the images are received can include one or more image capture devices and/or one or more video capture devices (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics images and/or video data, a combination of such sources, or other source of image frame content. In some examples, multiple image sources can provide images to the image processing system 102. For instance, in some cases, the short exposure images 101 can be received from a different image source than the image source providing the long exposure images 105.

The image processing system 102 can be part of a computing device or multiple computing devices. In some cases, the computing device (or devices) that includes the image processing system 102 can also include one or more wireless transceivers for wireless communications and/or a display for displaying one or more images. In some examples, the computing device that includes the image processing system 102 can be an electronic device, such as a mobile or stationary telephone handset (e.g., smartphone, cellular telephone, or the like), a camera (e.g., a digital camera, an IP camera, a video camera, a camera phone, a video phone, or other suitable capture device), a desktop computer, a laptop or notebook computer, a tablet computer, a set-top box, a television, a display device, a digital media player, a video gaming console, a video streaming device, or any other suitable electronic device. In some implementations, the image processing system 102 and the image source 101 can be part of the same computing device. For example, in some cases, a phone, camera, tablet, and/or device with an image source (e.g., a camera, storage, or the like) can include an integrated image processing system. In some implementations, the image processing system 102 and the image source 101 can be part of separate computing devices. In one illustrative example, the image source 101 can include one or more cameras, and the computing device including the image processing system 102 can include a mobile or stationary telephone handset, a desktop computer, a laptop or notebook computer, a tablet computer, or other computing device.

In one example, the image processing system 102 can receive one or more short exposure images of a scene that has low light conditions. Due to the low light conditions, the one or more short exposure images can lack color and can appear dark and possibly grainy due to noise. The image processing system 102 can also receive a long exposure image of the same low light scene. The long exposure image can appear blurry and cannot be used as output, but will have more color and brightness than the one or more short exposure images. In some cases, multiple short exposure images can be received, and the multiple short exposure images can be combined by the image combining engine 104 to generate a single short exposure image. In one illustrative example, the image combining engine 104 can combine the multiple short exposure images by averaging the pixels of the multiple short exposure images, resulting in an averaged short exposure image. In some examples, a weighted average of the pixels in the multiple short exposure images can be determined, and the pixels of the averaged short exposure image can include a weighted average value for each pixel. Using a weighted average can account for moving objects in the scene, in which case the objects can appear in different locations across the different short exposure images. In some examples, the multiple short exposure images can be aligned before being combined together by the image combining engine 104.

In some cases, a short exposure image of the scene can be processed by the denoising engine 106 to remove or reduce noise from the short exposure image. The image output from the denoising engine 106 can be referred to herein as a noise-reduced short exposure image or a noise-reduced image. The short exposure image processed by the denoising engine 106 can include a captured short exposure image or a combination of captured short exposure images (output from the image combining engine 104) when multiple short exposure images of the low light scene are captured. In some cases, the denoising engine 106 can implement a neural network to remove the noise from the short exposure image. For example, a convolutional neural network (CNN) can be used by the denoising engine 106. Further details of example neural networks are described below. Other suitable noise removal techniques can also be performed by the denoising engine 106.

The short and long exposure images of the scene can be processed by the color matching engine 108. The color matching engine 108 can perform local color matching so that the color information from the long exposure image is mapped to a short exposure image, which can include a captured short exposure image, a combined short exposure image (when multiple short exposure images of the scene are input to the image processing system 102 and processed by the image combining engine 104), or a noise-reduced short exposure image (when the denoising engine 106 is implemented). In one illustrative example, multiple short exposure images and one long exposure image of the low light scene can be captured. The multiple short exposure images can be combined (e.g., averaged or combined using another suitable technique) by the image combining engine 104, and the combined short exposure image can be output to the denoising engine 106 for noise removal. The noise-reduced short exposure image output from the denoising engine 106 can then be processed, along with the long exposure image, by the color matching engine 108.

In some cases, an affine transform can be used by the color matching engine 108 for mapping the color information from the long exposure image to the short exposure image (e.g., a captured short exposure image, a combined short exposure image, or a noise-reduced short exposure image). The affine transform can use information from a data structure to perform the mapping. The data structure can include a tensor, a grid, a matrix, or other suitable data structure. The data structure can be populated with information associated with the short and long exposure images. In one illustrative example, a three-dimensional (3D) tensor can be generated, and each cell of the tensor can include first and second moments of the color components (e.g., red (R), green (G), and blue (B) for RGB images) of the pixels in each of the short and long exposure images. In some cases, the first moment can include a mean or average, and the second moment can include a variance or standard deviation. In some examples, a filter can be applied to the data structure before the color matching is performed. In one example, when a 3D tensor is used, a 3D filter can be applied to the 3D tensor.

Using the information from the data structure, the affine transform can map the color information from the pixels of the long exposure image to the pixels of the short exposure image (e.g., a captured short exposure image, a combined short exposure image, or a noise-reduced short exposure image). In one illustrative example, if the first and second moments included in the data structure include mean and variance (or standard deviation), the affine transform can include a mean-variance matching process. Once the color matching is performed, the image processing system 102 can output an output image of the low light scene, which will have improved noise, brightness, and color characteristics.

Figure 2:
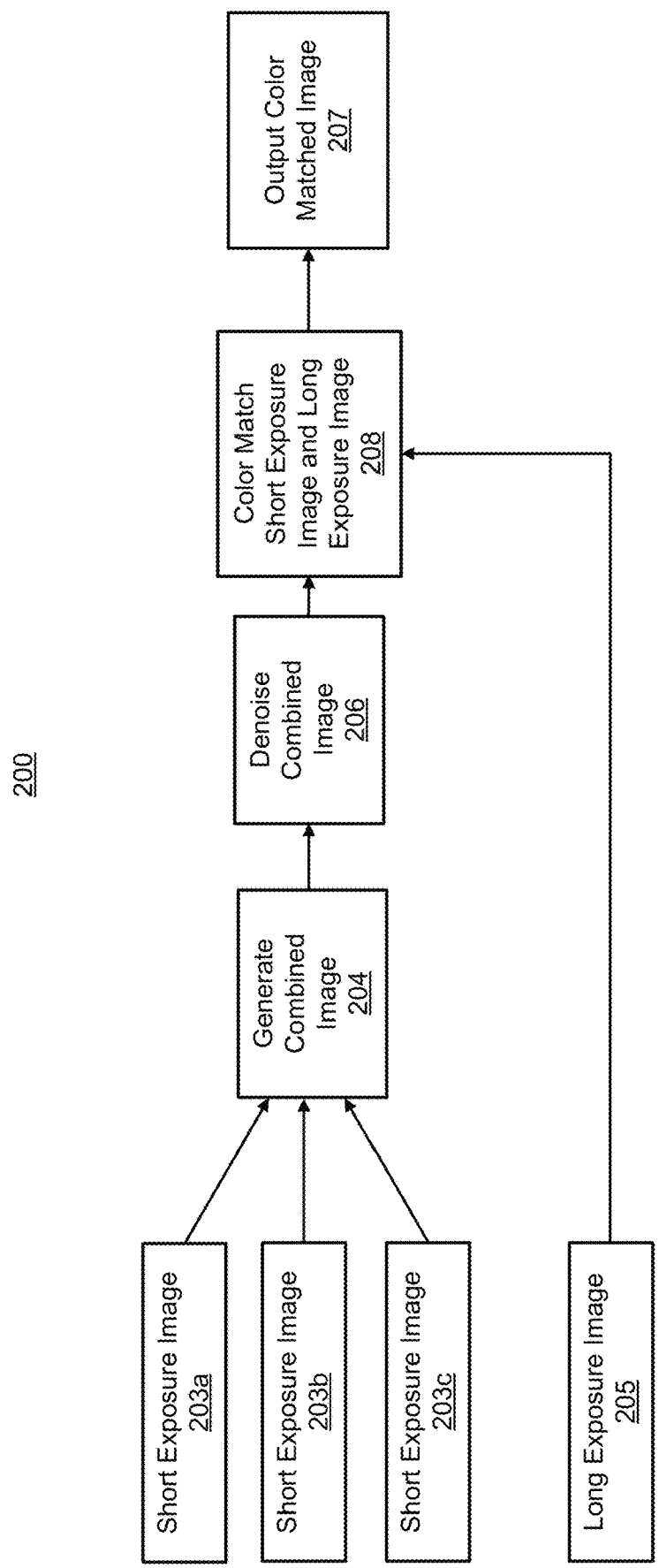
FIG. 2 is a flowchart illustrating an example of a process of processing low light images, in accordance with some examples.

FIG. 2 is a flowchart illustrating an example of a process 200 of processing low light images. As shown, three short exposure images of a low light scene are received, including short exposure image 203a, short exposure image 203b, and short exposure image 203c. A long exposure image 205 of the scene is also received. Exposure corresponds to how much light enters the camera and how the film or image sensor reacts to the light, and thus determines how light or dark an image will appear when it is captured by the camera. For example, exposure is the amount of light per unit area (the image plane illuminance times the exposure time) reaching a photographic film or electronic image sensor. The exposure is determined based on the shutter speed, the amount of aperture opening of the lens, the sensitivity of image sensor (or film), and the luminance in the scene.

In some examples, the short exposure images 203a, 203b, and 203c can have the same exposure period. By having a common exposure, the short exposure images 203a, 203b, and 203c can have common color and brightness characteristics. In some examples, short exposure images 203a, 203b, and 203c can have different exposures. The long exposure image 205 has a longer exposure period than the short exposure images 203a, 203b, and 203c. In some illustrative examples, the long exposure image 205 can have twice as much exposure period, three times the exposure period, or other exposure that is greater than the exposure of the short exposure images 203*a*, 203*b*, and 203*c*. For instance, the short exposure images 203*a*, 203*b*, and 203*c* can each have an exposure period of 100 milliseconds (ms) or less, and the long exposure image 206 can have an exposure period of 200 ms. In some examples, the computing device can automatically determine the exposure period of the short exposure images 203*a*, 203*b*, 203*c* and the long exposure images 205. In some examples, the exposure period can be manually set for the short exposure images 203*a*, 203*b*, 203*c*, and the exposure period of the long exposure image 205 can be automatically set by the computing device.

At block 204, the process 200 generates a combined image 204 based on the received short exposure images 203*a*, 203*b*, and 203*c*. In one illustrative example, the multiple short exposure images can be averaged by the image combining engine 104 to generate an averaged short exposure image. In some cases, the averaging can include calculating an average value of each pixel color component (e.g., each red (R), green (G), and blue (B) color component) at each corresponding pixel location of the short exposure images 203*a*, 203*b*, and 203*c*. For instance, for a top-left pixel location (0, 0) of the three short exposure images 203*a*, 203*b*, 203*c*, the values of three red (R) color components from the three images can be averaged. In one illustrative example, the value of the top-left pixel (at location (0, 0)) in the short exposure images 203*a* can have an R value of 190, the value of the top-left pixel (at location (0, 0)) in the short exposure images 203*a* can have an R value of 185, and the value of the top-left pixel (at location (0, 0)) in the short exposure images 203*a* can have an R value of 195. In such an example, the resulting R value of the top-left pixel (at location (0, 0)) in the averaged short exposure image will be 190. The green (G) and blue (B) color components of the pixels from the three short exposure images 203*a*, 203*b*, 203*c* can also be averaged using a similar technique. The average R, G, and B value for the top-left pixel location (0, 0) can be used in the averaged short exposure image.

Figure 3A:
FIG. 3A is an example of a first low light short exposure image of a scene, in accordance with some examples.
Figure 3B:
FIG. 3B is an example of a second low light short exposure image of a scene, in accordance with some examples.
Figure 3C:
FIG. 3C is an example of a third low light short exposure image of a scene, in accordance with some examples.
Figure 3D:
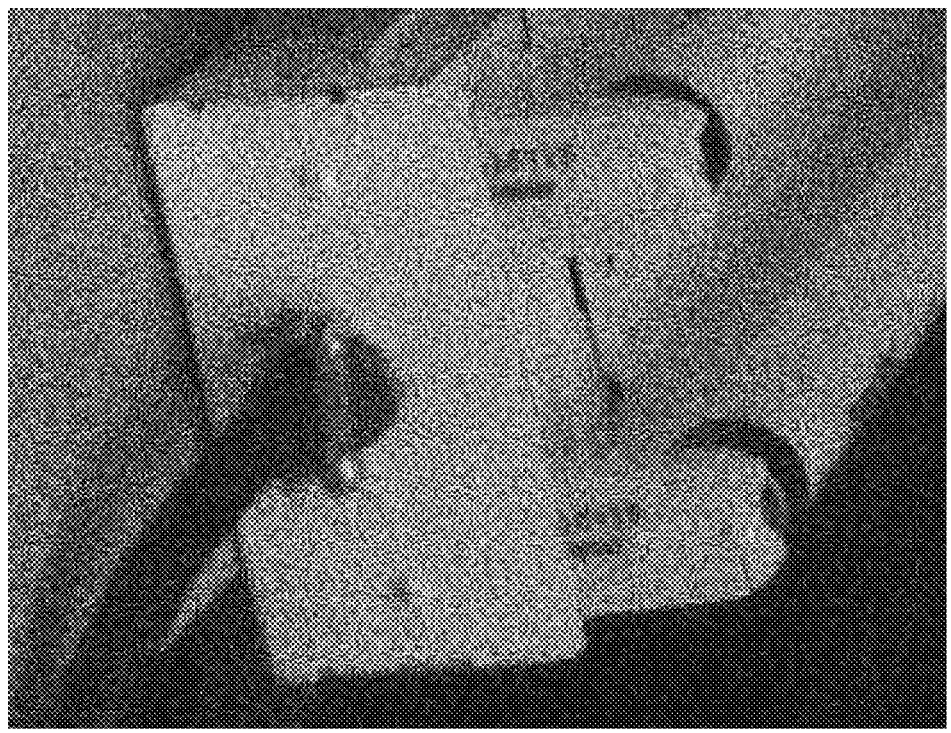
FIG. 3D is an example of a zoomed-in portion of the short exposure image shown in FIG. 3A, in accordance with some examples.
Figure 4A:
FIG. 4A is an example of a combined short exposure image of the scene resulting from combining the low light images shown in FIG. 2A-FIG. 2C, in accordance with some examples.
Figure 4B:
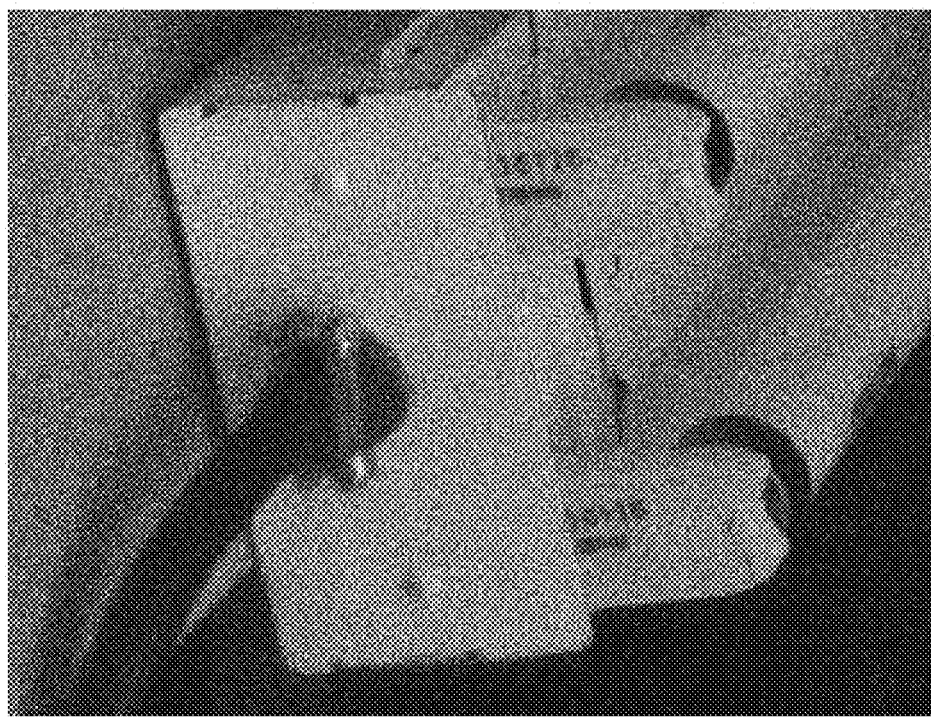
FIG. 4B is an example of a zoomed-in portion of the combined short exposure image shown in FIG. 4A, in accordance with some examples.

FIG. 3A, FIG. 3B, and FIG. 3C are photographs illustrating examples of three short exposure images 303*a*, 303*b*, and 303*c*. As noted above, and as can be seen by the images 303*a*, 303*b*, 303*c*, the short exposure images are dark, lack color, and have a grainy appearance due to noise. FIG. 3D is a photograph illustrating a zoomed-in portion of the short exposure image 303*a*. As can be seen, numerous grainy specks can be seen throughout the image shown in FIG. 3D. Such noise can be caused by random variation of brightness and/or color information due to the low light condition. Capturing multiple short exposure images and combining the multiple short exposure images (e.g., by averaging the pixel values) can help reduce the noise that may be present in the individual images. FIG. 4A is a photograph illustrating an example of a combined short exposure image 404 of the scene resulting from averaging the three low light images 303*a*, 303*b*, 303*c* shown in FIG. 3A-FIG. 3C. FIG. 4B is a photograph illustrating a zoomed-in portion of the combined short exposure image 404. As shown, there is less noise in the image 404 as compared to the noise in image 303*a* (as illustrated in FIG. 3D). However, there may still remain a large amount of noise in the combined short exposure image (as illustrated by the example shown in FIG. 4B).

In some examples, the short exposure images 303*a*, 303*b*, and 303*c* can be aligned by the image combining engine 104 before combining the three images. In some cases, the short exposure images 303*a*, 303*b*, and 303*c* can be captured at a same resolution so that the two images are the same size. In some cases, the short exposure images 303*a*, 303*b*, and 303*c* can be captured at different resolutions. When the images 303*a*, 303*b*, and 303*c* are captured at different resolutions, the smaller image(s) can be upscaled and/or the larger image(s) can be downscaled so that the images 303*a*, 303*b*, and 303*c* are of a common size. Any suitable image alignment technique can be used to align the short exposure images 303*a*, 303*b*, and 303*c*. In one illustrative example, a feature-based image alignment technique can be performed by the image combining engine 104. For instance, the image alignment can be performed using feature detection and feature matching. Feature detection can be performed to detect local features in each of the short exposure images 303*a*, 303*b*, and 303*c*. The local features can include any unique feature or features of objects in the image, such as people or parts of people (e.g., eyes, mouth, nose, bone structures, or the like), edges of a building and/or unique parts of the building, trees, or any other object or object feature.

The unique features can be referred to as keypoints or feature points, and can be detected using any suitable feature point detection technique. For instance, a feature point detection technique used by the image combining engine 104 can identify points on a short exposure image that are stable under image transformations, which can include translations (shifting), scaling (an increase or decrease in size), and rotations. In one illustrative example, the image combining engine 104 can find the (x, y) coordinates of the stable points. The feature point detection technique can then generate a descriptor defining the appearance of each identified point so the feature points can be distinguished from one another. In some cases, a feature descriptor can include an array of numbers or a vector including one or more values. The same physical point in each of the short exposure images 303*a*, 303*b*, and 303*c* should have the same feature descriptor.

Examples of feature point detection techniques include Scale Invariant Feature Transform (SIFT), Speed up Robust Feature (SURF), Oriented FAST and Rotated BRIEF (ORB), or other suitable keypoint detector. For example, using the SIFT technique, the image combining engine 104 can first estimate a scale space extrema using the Difference of Gaussian (DoG), and can then perform a key point localization where the key point candidates are localized and refined by eliminating the low contrast points. A key point orientation assignment based on local image gradient can then be performed, followed by a descriptor generator for computing the local image descriptor for each key point based on image gradient magnitude and orientation.

In some cases, the SURF technique can be used. For example, SURF approximates the DoG with box filters. Rather than Gaussian averaging the image, squares are used for approximation due to the convolution with squares being faster if the integral image is used. In some cases, the SURF technique can use a blob detector that is based on a Hessian matrix to find the points of interest. A blob can represent an object of interest in the image. For orientation assignment, wavelet responses can be used in both horizontal and vertical directions by applying Gaussian weights. Wavelet responses can also be sued for the feature descriptions. A neighborhood around a key point can be selected and divided into sub-regions. For each sub-region, the wavelet responses can be used to get a SURF-based feature descriptor. The sign of the Laplacian can be computed during the detection, and can be used for the underlying points of interest. The sign of the Laplacian distinguishes bright blobs on dark backgrounds from the reverse case. For feature matching, the features can be compared only if the features have a common sign (corresponding to a same type of contrast), providing faster matching.

As noted above, the same physical points (the feature points) in each of the short exposure images 303a, 303b, and 303c should have the same feature descriptors. Because the short exposure images 303a, 303b, and 303c have the same resolution, the three images can be aligned based on the feature points. For example, a pixel at an (x, y) location (300, 200) in the short exposure image 303a, which can correspond to a building corner, can be aligned at the same location (300, 200) in the other two short exposure images 303b and 303c.

The combined short exposure image can be processed by the denoising engine 206 to remove the remaining noise from the image. For example, at block 206, the process 200 can denoise the combined image to generate a noise-reduced short exposure image. In some cases, the denoising engine 206 can use a denoising neural network (e.g., a convolutional neural network, or other suitable neural network) to remove or reduce the noise from the combined image. In such cases, the denoising neural network can be trained by inputting multiple noisy versions of images together with clean versions of the same images. Using the known inputs (noisy images) and the known outputs (clean images), the denoising neural network can tune its parameters (e.g., weights, biases, etc.) to be able to output clean images (the noise-reduced images) from noisy images that are input into the neural network. The resulting noise-reduced images can have no noise or may still have some noise, but the noise is greatly reduced by the denoising neural network. Further details regarding neural networks that can be used are described below with respect to FIG. 12 and FIG. 13.

Figure 5A:
FIG. 5A is an example of a noise-reduced short exposure image of the scene shown in FIG. 3A-FIG. 3C, in accordance with some examples.
Figure 5B:
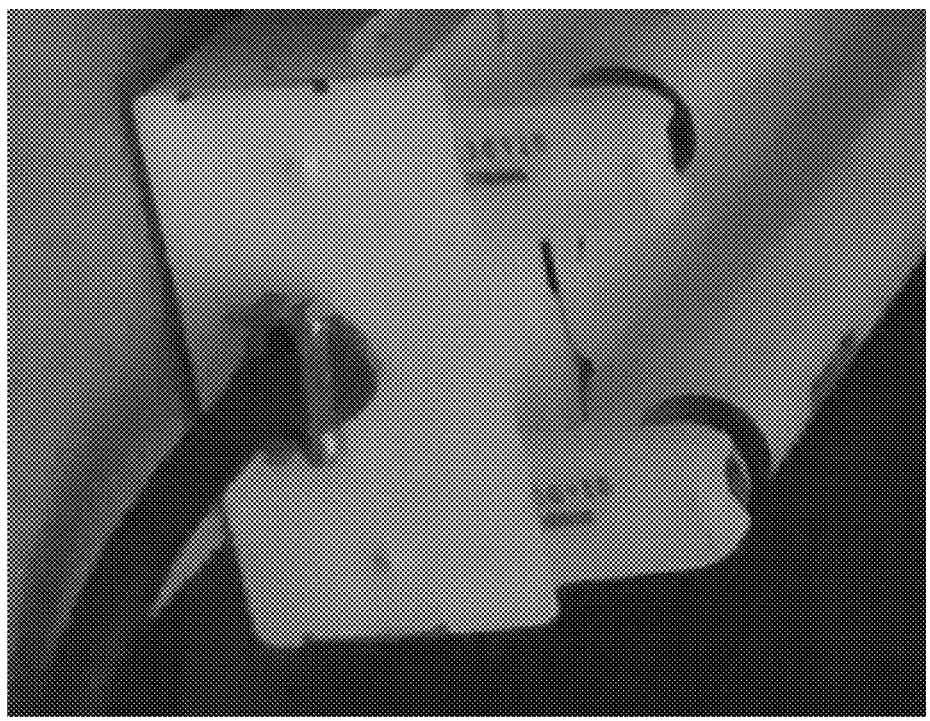
FIG. 5B is an example of a zoomed-in portion of the noise-reduced short exposure image shown in FIG. 5A, in accordance with some examples.

FIG. 5A is a photograph illustrating an example of a noise-reduced short exposure image 506 generated by applying a denoising neural network to the combined image 404 shown in FIG. 4A. FIG. 5B is a photograph illustrating a zoomed-in portion of the noise-reduced short exposure image 506. As shown, the noise is greatly reduced in the noise-reduced short exposure image 506 as compared to the noise present in the combined image 404 shown in FIG. 4A and FIG. 4B.

In some cases, the denoising engine 206 can use other noise removal techniques to generate a noise-reduced short exposure image. In some illustrative examples, other noise removal techniques can include median filtering, filtering using an average with limited data validity, Anisotropic diffusion, a Gaussian blur function, geometric mean filtering, non-local means filtering, local means filtering, bilateral filtering, block-matching and three-dimensional (3D) filtering, local pixel grouping, filtering using a Wiener filter, any combination thereof, and/or any other suitable noise filtering technique.

Figure 6:
FIG. 6 is an example of a long exposure image of the scene shown in FIG. 3A-FIG. 3C, in accordance with some examples.

The output of the denoising engine 206 is a noise-reduced short exposure image. However, the noise-reduced image will still not have the desirable color information due to the effect of the low light conditions on the short exposure images used to generate the noise-reduced short exposure image. The long exposure image 205 of the low light scene that was also captured can be used to provide color information for the noise-reduced image. FIG. 6 is a photograph illustrating an example of a long exposure image 605 of the same scene captured by the short exposure images 303a, 303b, and 303c. As can be seen, the long exposure image 605 retains much brighter colors than the short exposure images 303a, 303b, and 303c. However, the long exposure image 605 is blurry and cannot be used directly as output.

Figure 7:
FIG. 7 is an example of a color-matched output image of a scene resulting from performing color matching between a short exposure image and a long exposure image of the scene, in accordance with some examples.

After reducing the noise at block 206, the process 200 can apply a local color matching technique or algorithm to the noise-reduced image to improve colors and brightness. The input to the color matching algorithm includes the long exposure image 205 and the noise-reduced image output from block 206. At block 208, the process 200 can color match the noise-reduced short exposure image and the long exposure image 205 using the color matching technique to produce a color matched image. The color matching technique will be described in more detail below with respect to FIG. 8. At block 207, the process 200 outputs a color matched image (also referred to as an output image). FIG. 7 is a photograph illustrating an example of an output image 708 resulting from performing the color matching technique on the noise-reduced short exposure image and the long exposure image 605.

Figure 8:
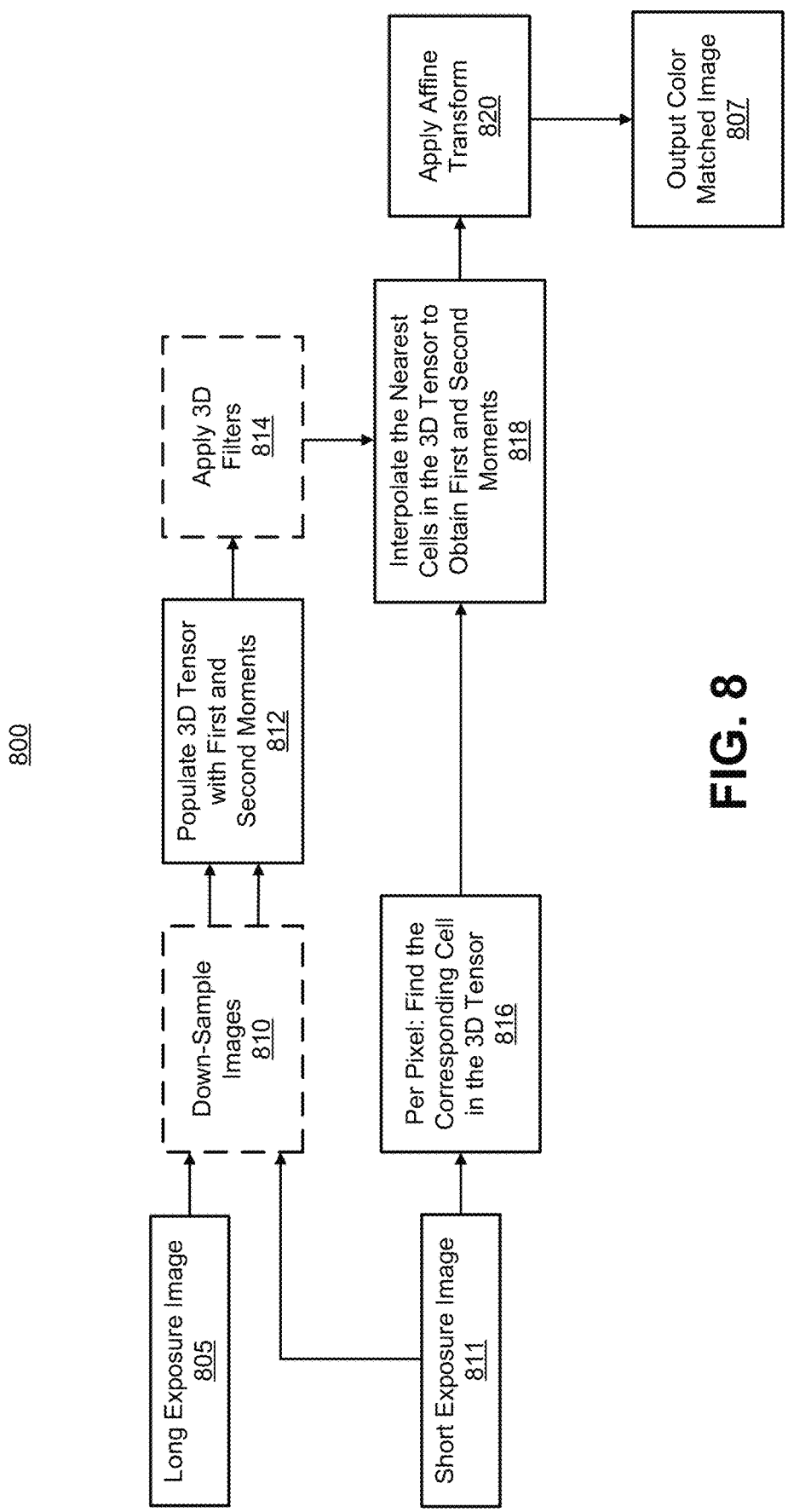
FIG. 8 is a flowchart illustrating an example of a process of performing color matching between a short exposure image and a long exposure image, in accordance with some examples.

FIG. 8 is a flowchart illustrating an example of a process 800 performing color matching between a short exposure image and a long exposure image. The color matching technique is an edge-aware technique that locally matches statistics of the color components (e.g., R, G, B) of two input images, such as the short exposure image 811 and the long exposure image 805. The short exposure image 811 can include a captured short exposure image (without performing image combining or denoising), a combined image (without performing denoising), or a noise-reduced short exposure image output from the denoising engine 106. The color matching technique is different than local tone mapping, which involves making a single image brighter or darker. In some cases, the color matching technique can compute an affine transform that maps the statistics of the short exposure image 811 and the long exposure image 805. In some examples, the statistics can include mean and standard deviation (or variance). In such examples, the affine transform can be a mean-variance matching algorithm, in which case the mean and standard deviation (or variance) of the short exposure image 811 are matched to the mean and standard deviation (or variance) of the long exposure image 805. The mean-variance color matching algorithm will be described in more detail below.

The color matching engine 108 (e.g., using an affine transform) can reference information stored in a data structure in which the statistics of the short exposure image 811 and the long exposure image 805 are stored. For example, the data structure can be generated and populated with the statistical information, after which the color matching technique can be applied using the statistical information stored in the data structure. The data structure can include a tensor, a bilateral grid, a matrix, or other suitable data structure. A three-dimensional (3D) tensor (e.g., a bilateral grid) will be used herein as an example of the data structure. Use of a 3D tensor allows the color matching to be performed in an edge-aware manner, so important features (e.g., edges) of the objects in the input images are maintained. At block 812, the process 800 (using the color matching engine 108) can construct and populate the 3D tensor with the statistics. The 3D tensor includes multiple cells in three dimensions. Each cell of the 3D tensor can include first and second moments of the color components (e.g., red (R), green (G), and blue (B) for RGB images) of the pixels in each of the short exposure image 811 and the long exposure 805. In some cases, the first moment can include a mean or average, and the second moment can include a variance or standard deviation.

In some cases, the short exposure image 811 and the long exposure image 805 can be downsampled at block 310. The downsampling is optional, as indicated by the dotted outline of block 810. The downslampling can be performed in order to lower the number of calculations that are needed to populate the 3D tensor. For example, if the short exposure image 811 and the long exposure image 805 are downsampled by a factor of 10 in each direction, the number of pixels that are needed to calculate the first and second moments (e.g., mean and variance or standard deviation) to populate one grid cell is reduced by a factor of 100. The two images do not have to have the same resolution. Also the amount of information stored in the grid is independent of the image size.

The three dimensions of the 3D tensor include two dimensions corresponding to the spatial (x, y) dimensions of the input images 811, 805, and a third dimension for luminance (luma). As used herein, the term luminance can refer to relative luminance or luma. For instance, each layer in the third dimension can correspond to a range of luminance intensity values of the pixels from the images. In one illustrative example, the pixels in the input images can have luminance values ranging from 0-255, and there can be five ranges of luminance intensity values (corresponding to five layers in the 3D tensor). In such an example, the ranges of luminance intensity values can include a first range of 0-50, a second range of 51-101, a third range of 102-152, a fourth range of 153-203, and a fifth range of 204-255. One of ordinary skill will appreciate that any numbers of ranges can be used.

As noted above, each cell in the 3D tensor is populated with first moments and second moments of the color components (e.g., R, G, B) for each of the input images 811, 805. The first moments included in a cell can include a mean of a patch of pixels from the short exposure image 811 and a mean of a group of pixels from the long exposure image 805. The second moments in the same cell can include a standard deviation of the patch of pixels from the short exposure image 811 and a standard deviation of the patch of pixels from the long exposure image 805. A patch of pixels can include any number of pixels, such as a 20×20 patch of pixels located at (x, y) positions (0, 0) through (20, 20) in the images.

Figure 9:
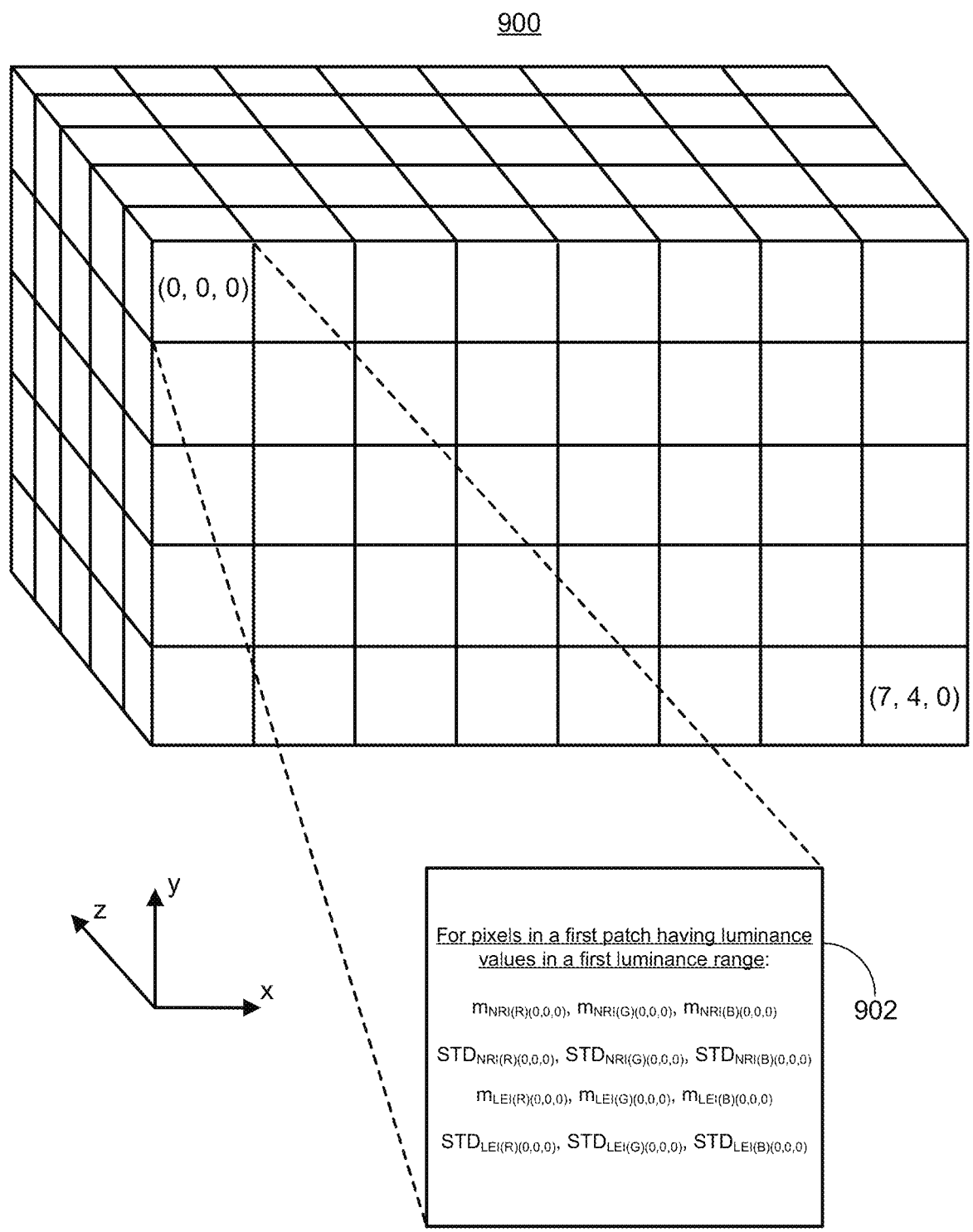
FIG. 9 is a conceptual diagram illustrating an example of a three-dimensional tensor, in accordance with some examples.

FIG. 9 is a conceptual diagram illustrating an example of a 3D tensor 900 populated with first and second moments of a noise-reduced short exposure image (denoted as NRI) and first and second moments of a long exposure image (denoted as LEI) input to the color matching engine 108. While a noise-reduced short exposure image is used in the example of FIG. 9, one of ordinary skill will appreciate that a captured short exposure image, or a combined short exposure image, can also be analyzed to determine statistical information for inclusion in the 3D tensor 900. For illustrative purposes, an example will be described herein where the first moment includes a mean (or average) and the second moment includes a standard deviation. However, other statistical characteristics of the pixels can be used in the 3D tensor 900. In one illustrative example, the noise-reduced short exposure image and the long exposure image can both have a resolution of 160 pixels×100 pixels. For example, the two images can be captured with a same resolution. In another example, one or both of the short exposure image and the long exposure image can be downsampled (e.g., at block 810) or upsampled so that the two images have a same resolution. In such an example, the 3D tensor 900 can have a grid of 8×5 cells in the x- and y-dimensions, as shown in FIG. 9. Each cell in the grid includes first and second moments corresponding to a patch of 20 pixels×20 pixels from the noise-reduced short exposure image, and first and second moments corresponding to a patch of 20 pixels×20 pixels from the long exposure image. One of ordinary skill will appreciate that the images can have any suitable resolution, such as 1,280×720 pixels, 1,920×1,080 pixels, 3,840×2,160 pixels, or other suitable resolution. The number of cells of a 3D tensor, and/or the number of pixels each cell represents, can change based on the resolution of the input images.

In some cases, the short exposure image 811 and the long exposure image 805 do not need to have a same resolution when populating the grid. In such cases, additional processing may be needed to map the corresponding patches of the short and long exposure images. For instance, using a short exposure image having a resolution of 100×200 and a long exposure image having a resolution of 200×400 as an illustrative example, if a cell in the grid of the 3D tensor corresponds to a 10×10 patch of pixels in the short exposure image, the 10×10 patch would correspond to a 20×20 patch in the long exposure image.

The 3D tensor 900 also has a depth of 5 layers, resulting in the 3D tensor 900 having a dimensions of 8×5×5. Each layer in the 3D tensor 900 corresponds to a range of luminance values. In one illustrative example, the pixels in the input images can have luminance values ranging from 0-255, and there can be five ranges of luminance values (corresponding to the five layers in the 3D tensor 900). In such an example, the ranges of luminance values can include a first range of 0-50, a second range of 51-101, a third range of 102-152, a fourth range of 153-203, and a fifth range of 204-255. In another example, instead of five ranges, ten ranges can be used, in which case the luminance ranges can include 0-24, 25-50, 51-75, 76-101, 102-126, 127-152, 153-177, 178-203, 204-229, and 230-255. One of ordinary skill will appreciate that any numbers of ranges can be used.

The noise-reduced short exposure image and the long exposure image can include any suitable type of image, such as an RGB image, a YCbCr images, or other type of image. For YCbCr images (as well as other color spaces with a luminance (e.g., Y) component), the Y component indicates the luminance of the pixel, in which case the luminance does not need to be computed. As previously noted, the term luminance can refer herein to relative luminance or luma. The luminance of the pixels of an RGB image can be determined using any suitable technique. In one illustrative example, luminance of an RGB pixel can be calculated as the weighted sum of the color components of the RGB pixel. For instance, luminance can be determined by performing the following calculation:

$$Y=aR+bG+cB, \qquad \text{Equation (1)}$$

where the R term represents the red component of a pixel (e.g., a value between 0-255), the G term represents the green component of the pixel (e.g., a value between 0-255), and the B term represents the blue component of the pixel (e.g., a value between 0-255). The R, G, and B components can be gamma-compressed components (e.g., R', G', B' to determine luma, where the prime symbol denotes gamma compression), or can be linear components (R, G, B to determine relative luminance). The a, b, and c terms are weights that, when added together, equal a value of 1, 100, or other suitable normalization value. The a, b, and c terms can be set to any suitable value. For example, the value of each of the a, b, and c terms can be set based on the relative contribution of each color component to the intensity perceived by humans. In one illustrative example, the a term can be set to a value of 0.2126, the b term can be set to a value of 0.7152, and the c term can be set to a value of 0.0722, indicating that the green color contributes most to the intensity perceived by humans, and the blue color contributes the least. Any other suitable values can be used for the a, b, and c weight terms.

In the illustrative example from above, each of the noise-reduced short and long exposure images has a resolution of 160 pixels×100 pixels, resulting in each cell of the 3D tensor 900 representing a patch of 20×20 pixels. Using such an example, each cell in the grid of the 3D tensor 900 can include at least one mean and at least one standard deviation for a patch of 20 pixels×20 pixels from the noise-reduced short exposure image, and at least one mean and at least one standard deviation for a patch of 20 pixels×20 pixels from the long exposure image. For instance, per pixel patch and per color channel (e.g., per each of the R, G, and B color channels), a mean and a standard deviation of the patch of the reduced-noise image and a mean and a standard deviation of the patch of the long exposure images can be stored in every grid cell.

The mean for a patch of pixels per color component can be computed by adding together each of the pixel values (for that color component) in the patch, and dividing by the total number of pixels in the patch. Using a size of 20×20 for the pixel patches as one illustrative example, the values of the 400 pixels in a 20×20 patch can be added together, and the resulting sum can be divided by 400 to obtain the mean value for the 20×20 patch. The standard deviation for a patch of pixels per color component can be determined by first calculating the variance for the patch, and then taking the square root of the variance. The variance of a patch of pixels can be computed using the following equation:

$$\sigma^2 = \frac{\sum (X-\mu)^2}{N}, \quad \text{Equation (2)}$$

where $\sigma^2$ is the variance of a group (e.g., a patch of pixels), X is a given sample (e.g., a pixel value for a given color component), $\mu$ is the mean of the group, and N is the number of samples in the group. According to equation (2), the deviation of each pixel value (X) from the mean ($\mu$) of the patch of pixels can be determined (e.g., by subtracting the mean from the pixel value or the pixel value from the mean), and the result of each deviation is squared. The variance ($\sigma^2$) is then determined by taking the mean of the squared results. The square root of the variance can then be computed in order to obtain the standard deviation of the patch of pixels (for a given color component). In some cases, the variance of a pixel patch can be stored in the 3D tensor instead of the standard deviation.

In some cases, each cell can be referenced by a location (x, y, z), where the x term indicates the row in the 3D tensor 900, the y term indicates the column in the 3D tensor 900, and the z term indicates the layer (or depth) in the 3D tensor 900. In one illustrative example, a top-left cell 902 in a first layer of the 3D tensor 900 can be referenced as being at location (0, 0, 0) of the 3D tensor 900. The cell 902 can include the means and standard deviations (e.g., a mean and standard deviation for each color component) of a first patch of pixels from the reduced-noise short exposure image, and the means and standard deviations of a first patch of pixels from the long exposure image. In an illustrative example, the first patch of pixels can include a top-left most patch of 20×20 pixels from each of the reduced-noise short exposure image and the long exposure image. Only those pixels from the first patch of pixels that have luminance values within a first range of luminance values are considered when calculating the statistics that are to be included in the cell 902 at location (0, 0, 0). Using the illustrative example from above where five ranges of luminance values are used, the first range of luminance values can be between 0-50, in which case only those pixels from the first patch of pixels having a luminance value between 0-50 will be considered when determined the means and standard deviations for the cell 902.

For example, the cell 902 can include a mean (denoted as $m_{NRI(R)(0,0,0)}$) and a standard deviation (denoted as $STD_{NRI(R)(0,0,0)}$) of the red (R) component values of the pixels from the top-left most 20×20 pixel patch in the noise-reduced image that have luminance values between 0-50, a mean (denoted as $m_{NRI(G)(0,0,0)}$) and a standard deviation (denoted as $STD_{NRI(G)(0,0,0)}$) of the green (G) component values of the pixels from the top-left most 20×20 patch in the noise-reduced image that have luminance values between 0-50, and a mean (denoted as $m_{NRI(B)(0,0,0)}$) and a standard deviation (denoted as $STD_{NRI(B)(0,0,0)}$) of the blue (B) component values of the pixels from the top-left most 20×20 patch in the noise-reduced image that have luminance values between 0-50. The cell 902 can also include a mean (denoted as $m_{LEI(R)(0,0,0)}$) and a standard deviation (denoted as $STD_{LEI(R)(0,0,0)}$) of the red (R) component values of the pixels from the top-left most 20×20 pixel patch in the long exposure image that have luminance values between 0-50, a mean (denoted as $m_{LEI(G)(0,0,0)}$) and a standard deviation (denoted as $STD_{LEI(G)(0,0,0)}$) of the green (G) component values of the pixels from the top-left most 20×20 patch in the long exposure image that have luminance values between 0-50, and a mean (denoted as $m_{LEI(B)(0,0,0)}$) and a standard deviation (denoted as $STD_{LEI(B)(0,0,0)}$) of the blue (B) component values of the pixels from the top-left most 20×20 patch in the long exposure image that have luminance values between 0-50.

A top-left cell (at location (0, 0, 1) in a second layer of the 3D tensor 900 can include a mean and a standard deviation for each color component of the top-left most 20×20 pixel patch from the noise-reduced image that have luminance values between 51-101, and a mean and a standard deviation for each color component of the top-left most 20×20 pixel patch from the long exposure image that have luminance values between 51-101. The remaining cells of the 3D tensor 900 can be populated with means and standard deviations of other pixel patches of the noise-reduced image and the long exposure image values in a similar manner.

In some examples, a filter can be applied to the data structure before the color matching is performed. In one example, when a 3D tensor is used as the data structure, a 3D filter can be applied to the 3D tensor at block 814 of process 800. The filtering is optional, as indicated by the dotted outline of block 814. The 3D filters can include low pass filters that are used to smooth out the numbers in the 3D tensor, which can prevent sharp transitions between cells.

Once the 3D tensor is populated with local means and variances of the short exposure image 811 and the long exposure image 805 and the 3D filters are applied (in cases in which the data structure is filtered), the color matching engine 108 can perform the color matching between the short exposure image 811 and the long exposure image 805. For example, as previously noted, an affine transform can be computed, which maps the first two moments between a source image (the short exposure image 811) and a target image (the long exposure image 805). The local affine maps can then be applied to the individual pixels of the short exposure image 811 One example of an affine transform is mean-variance matching, which can be defined as follows:

$$y=((x-m_d)/STD_d)*STD_L+m_L, \quad \text{Equation (3)}$$

where $m_d$ is the mean of the short exposure image 811 (e.g., a reduced-noise short exposure image), $STD_d$ is the standard deviation of the short exposure image 811, $m_L$ is the mean of the long exposure image 805, and $STD_L$ is the standard deviation of the long exposure image 805. The term x is the pixel value of the pixel (p), and the term y is the color-matched output pixel value calculated based on application of the mean-variance color matching equation (3).

The mean-variance matching maps the mean and standard deviation information from the long exposure image 805 to the short exposure image 811. The resulting mapping can then be applied (as an affine transform) to the individual pixels of the short exposure image 811 by using information from one or more cells of the 3D tensor. The one or more cells are identified for a pixel of the short exposure image 811 based on the spatial locations (x, y) and the luminance value of the pixel. Accordingly, the mapping between the mean and standard deviation values of the patches of pixels from the two images 805 and 811 can be used to map the colors from the long exposure image 805 to the individual pixels of the short exposure image 811. The mapping results in an output color matched image that includes a reduced-noise image (when denoising is applied) with improved color and brightness.

To perform the color matching using the mean-variance matching equation (3), blocks 816, 818, and 820 can be performed per pixel (p) and per color channel (e.g., per R, G, and B color channels for an RGB image) of the short exposure image. As noted previously, a mean and standard deviation (or variance) of the short exposure image 811 and a mean and a standard deviation (or variance) of the long-exposure image 805 are stored, per color channel, in every 3D tensor grid cell. For each pixel of the short exposure image 811, the process 800 finds the corresponding cell in the 3D tensor at block 816. For example, the color matching engine 108 can find the cell in the 3D tensor where a pixel (p) resides, based on the location and the luminance of the pixel p. The identified cell for pixel p can be denoted c0. In one illustrative example, the pixel (p) can be located in a patch of pixels (e.g., a top-left patch of 20×20 pixels, or other suitable patch) that corresponds to the (x, y) position of the cell c0 in the 3D tensor, and can have a luminance value falling in the luminance range that corresponds to the layer (the z position) of the cell c0 in the 3D tensor.

The color matching engine 108 can obtain the means and standard deviations (or variances) stored in the cell c0 (denoted as $m_{L0}$, $STD_{d0}$, $m_{d0}$, and $STD_{d0}$) for each color component. In some case, the color matching engine 108 can also obtain the means and standard deviations (or variances) of one or more neighboring cells of the identified cell c0. For example, for a given cell c0, there can be up to a total of 7 neighbors in the 3D space. In one illustrative example, two nearest neighbors can be selected in each direction (x, y, z), resulting in a total of 8 cells (2×2×2). The two cells in each direction include the cell in which the pixel resides (c0) and the cell before or after c0 depending on the relative location of the pixel to the center of c0. The means and standard deviations (or variances) of the cells are denoted as $m_{Li}$, $STD_{Li}$, $m_{di}$, and $STD_{di}$, where i=0, 1, 2, 3, . . . , 7.

In cases when the neighboring cell values are obtained, the process 800 at block 818 can interpolate the nearest cells in the 3D tensor to obtain the first and second moments that will be used by the affine transform (e.g., the mean-variance matching). For instance, the color matching engine 108 can interpolate the means and the standard deviations (or variances) based on the distance of the pixel p from the center of every cell, including the identified cell c0 and the nearest neighbor cells. In one illustrative example, if the cells are 21×21 pixels in the x- and y-directions, then the pixel at location (11, 11) in a cell is the center pixel. For color matching a pixel at location (15, 20), the distance to the center in the x-direction is 4 (15 minus 11) and the distance to the center in the y-direction is 9 (20 minus 11). For the x-direction, because 15>11, the cell after c0 in the x-direction is considered as the nearest neighbor. For the y-direction, because 20>11, the cell after c0 in the y-direction is considered as the nearest neighbor. The same applies to the z-direction (luminance). The interpolated means and standard deviations (or variances) can then be determined as the weighted average of the values in the identified cell c0 and the values in the nearest neighbor cells. The weights used for the weighted average are inversely proportional to the distances, in which case a higher weight is used for values in the cells that have a center with a shorter distance to the pixel for which color matching is currently being performed. The resulting means and standard deviations are denoted as $m_L$, $STD_L$, $m_d$, and $STD_d$, which are the terms to be used in the mean-variance matching equation (3).

The affine transform is applied at block 820 of the process 800. For example, using the pixel value x of the pixel p from the short exposure image 811, the mean-variance color matching equation (3) can be applied to calculate the color-matched output pixel value (denoted as y) that will be used in the output color matched image. Once all color matched pixel values (the y values) are determined for the color matched image, the process 800 can output the color matched image at block 807.

Using the above-described low light image processing techniques, high quality images of a low light scene can be provided that have improved noise, brightness, and color characteristics. While the techniques described herein are described with respect to low light images, the color matching can be used for any color-matching problem, as long as the two images are captured from the same scene. In one illustrative example, the color matching can be used to combine two images, where a first image is captured with a flash and the second image is captured without flash.

Figure 10:
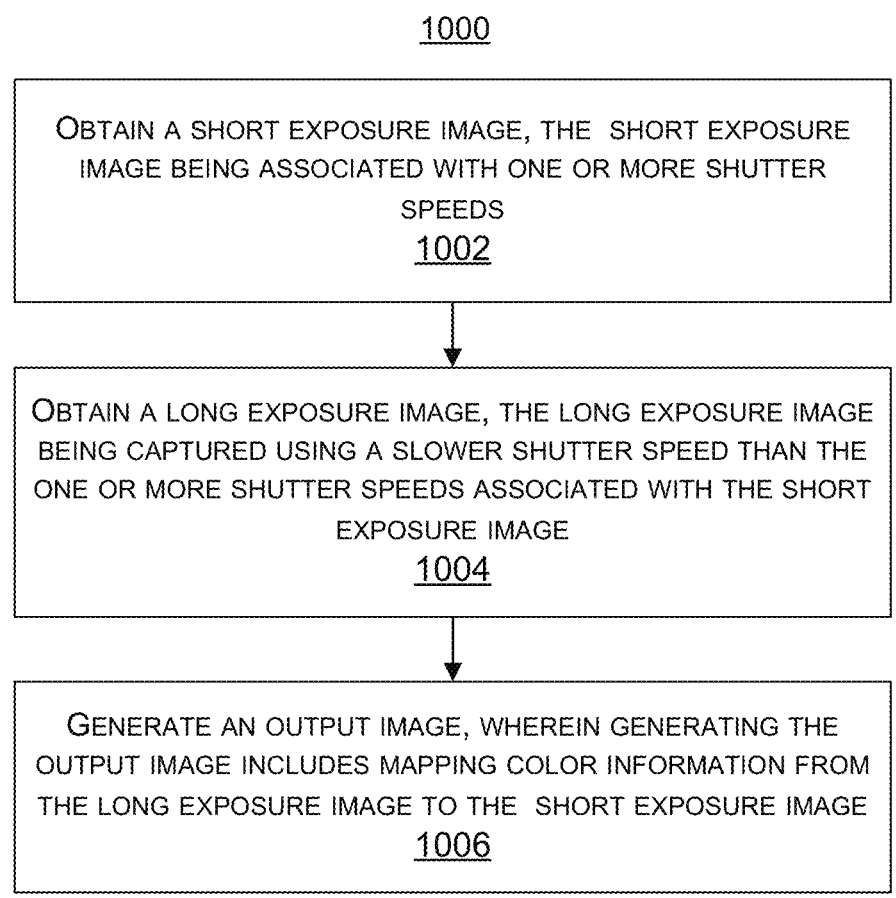
FIG. 10 is a flowchart illustrating an example of a process for processing one or more low light images, in accordance with some examples.

FIG. 10 is a flowchart illustrating an example of a process 1000 of processing one or more low light images using the image processing techniques described herein. At block 1002, the process 1000 includes obtaining a short exposure image. The short exposure image is associated with one or more shutter speeds. The short exposure image can include a single captured short exposure image, a noise-reduced short exposure image generated from a short exposure image, or a combined short exposure image. For instance, in some cases, the short exposure image is an image captured using a particular shutter speed. In another example, in some cases, the short exposure image is a noise-reduced short exposure image generated from one or more short exposure images captured using the one or more shutter speeds. In such cases, generating the output image can include mapping the color information from the long exposure image to the noise-reduced short exposure image. In some examples, the process 1000 can include generating the noise-reduced short exposure image by processing the one or more short exposure images using a neural network. In such examples, the neural network is trained to remove noise from the one or more short exposure images.

In some examples, the process 1000 can include receiving a plurality of short exposure images captured using the one or more shutter speeds. The process 1000 can further include generating an averaged short exposure image by averaging pixels from the plurality of short exposure images. The averaging can include a weighted average in some cases. In some instances, the short exposure image is a noise-reduced short exposure image generated from the averaged short exposure image. In such cases, generating the output image includes mapping the color information from the long exposure image to the noise-reduced short exposure image. In some examples, the process 1000 can include generating the noise-reduced short exposure image by processing the averaged short exposure image using a neural network. In such examples, the neural network is trained to remove noise from the averaged short exposure image.

At block 1004, the process 1000 includes obtaining a long exposure image. The long exposure image is captured using a slower shutter speed than the one or more shutter speeds associated with the short exposure image. In various illustrative examples, the long exposure image can have twice the exposure period, three times the exposure period, or other exposure period that is greater than exposures of the one or more shutter speeds associated with the short exposure image. In one example, an exposure associated with the short exposure image can have an exposure period of 100 milliseconds (ms) or less, and the long exposure image can have an exposure period of 200 ms.

At block 1006, the process 1000 includes generating an output image. Generating the output image includes mapping color information from the long exposure image to the short exposure image. In some cases, luminance information can also be mapped from the long exposure image to the noise-reduced short exposure image. In some examples, mapping the color information from the long exposure image to the short exposure image includes applying an affine transform to the short exposure image. The affine transform can map one or more color moments between the long exposure image and the short exposure image. The one or more color moments can be included in a three-dimensional tensor. In some cases, the process 1000 can include applying one or more three-dimensional filters to the three-dimensional tensor. In one illustrative example, a three-dimensional filter can include a low pass filter.

In some implementations, the affine transform includes mean-variance matching. In such cases, the one or more color moments can include a mean and a variance of pixels from the short exposure image and a mean and a variance of pixels from the long exposure image.

The process 1000 can include generating the three-dimensional tensor. As described above, the three-dimensional tensor includes a plurality of cells, with each cell including at least one mean of a group of pixels from the short exposure image, at least one standard deviation of the group of pixels from the short exposure image, at least one mean of a group of pixels from the long exposure image, and at least one standard deviation of the group of pixels from the long exposure image. The three-dimensional tensor can include a plurality of layers of cells, where each layer of the three-dimensional tensor corresponds to a different range of luminance values. In some cases, each cell of the three-dimensional tensor can include a mean and a standard deviation for each color component of the color space used for the images (e.g., a mean and standard deviation for the red components, a mean and standard deviation for the green components, and a mean and standard deviation for the blue components of the pixels represented by the cell).

FIG. 11 is a flowchart illustrating another example of a process 1000 of processing one or more low light images using the image processing techniques described herein. At block 1102, the process 1100 includes obtaining one or more short exposure images. The one or more short exposure images are captured using one or more shutter speeds. At block 1104, the process 1100 includes generating a noise-reduced short exposure image from the one or more short exposure images. For example, generating the noise-reduced short exposure image can be performed by processing the one or more short exposure images using a neural network trained to remove noise from the one or more short exposure images. In some examples, the process 1100 can include receiving a plurality of short exposure images captured using the one or more shutter speeds. The process 1100 can generate an averaged short exposure image by averaging pixels from the plurality of short exposure images. The averaging can include a weighted average in some cases. In such examples, the process 1100 can include generating the noise-reduced short exposure image by processing the averaged short exposure image using a neural network trained to remove noise from the averaged short exposure image.

At block 1106, the process 1100 includes obtaining a long exposure image. The long exposure image is captured using a slower shutter speed than the one or more shutter speeds used to capture the one or more short exposure images. At block 1108, the process 1100 includes generating an output image. Generating the output image includes mapping color information from the long exposure image to the noise-reduced short exposure image. In some cases, luminance information can also be mapped from the long exposure image to the noise-reduced short exposure image. In some cases, mapping the color information from the long exposure image to the noise-reduced short exposure image includes applying an affine transform to the noise-reduced short exposure image. The affine transform can map one or more color moments between the long exposure image and the noise-reduced short exposure image. The one or more color moments can be included in a three-dimensional tensor. In some cases, the process 1100 can include applying one or more three-dimensional filters to the three-dimensional tensor. In one illustrative example, a three-dimensional filter can include a low pass filter.

In some implementations, the affine transform includes mean-variance matching. In such cases, the one or more color moments can include a mean and a variance of pixels from the noise-reduced short exposure image and a mean and a variance of pixels from the long exposure image.

In some examples, the process 1100 can include generating the three-dimensional tensor. As described above, the three-dimensional tensor includes a plurality of cells, with each cell including at least one mean of a group of pixels from the noise-reduced short exposure image, at least one standard deviation of the group of pixels from the noise-reduced short exposure image, at least one mean of a group of pixels from the long exposure image, and at least one standard deviation of the group of pixels from the long exposure image. The three-dimensional tensor can include a plurality of layers of cells, where each layer of the three-dimensional tensor corresponds to a different range of luminance values. In some cases, each cell of the three-dimensional tensor can include a mean and a standard deviation for each color component of the color space used for the images (e.g., a mean and standard deviation for the red components, a mean and standard deviation for the green components, and a mean and standard deviation for the blue components of the pixels represented by the cell).

In some examples, the processes 1000 and 1100 may be performed by a computing device or an apparatus, which can include the image processing system 102 shown in FIG. 1. In some cases, the computing device or apparatus may include a processor, microprocessor, microcomputer, or other component of a device that is configured to carry out the steps of the processes 1000 and 1100. In some examples, the computing device or apparatus may include a camera configured to capture images and/or video data (e.g., a video sequence) including video frames. For example, the computing device may include a mobile device with a camera (e.g., a digital camera, an IP camera, a mobile phone or tablet including a camera, or other type of device with a camera). In some cases, the computing device may include a display for displaying the output images. In some cases, the computing device may include a video codec. In some examples, a camera or other capture device that captures the images and/or video data is separate from the computing device, in which case the computing device receives the captured video data. The computing device may further include a network interface configured to communicate the video data. The network interface may be configured to communicate Internet Protocol (IP) based data or other suitable network data.

Process 1000 and 1100 are illustrated as a flowchart or logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1000 and 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, the denoising engine 106 can remove noise from images using a neural network. Any suitable neural network can be used to remove the noise. In some cases, the neural network can be a network designed to perform classification. Illustrative examples of deep neural networks that can be used include a convolutional neural network (CNN), an autoencoder, a deep belief net (DBN), a Recurrent Neural Networks (RNN), or any other suitable neural network.

Figure 12:
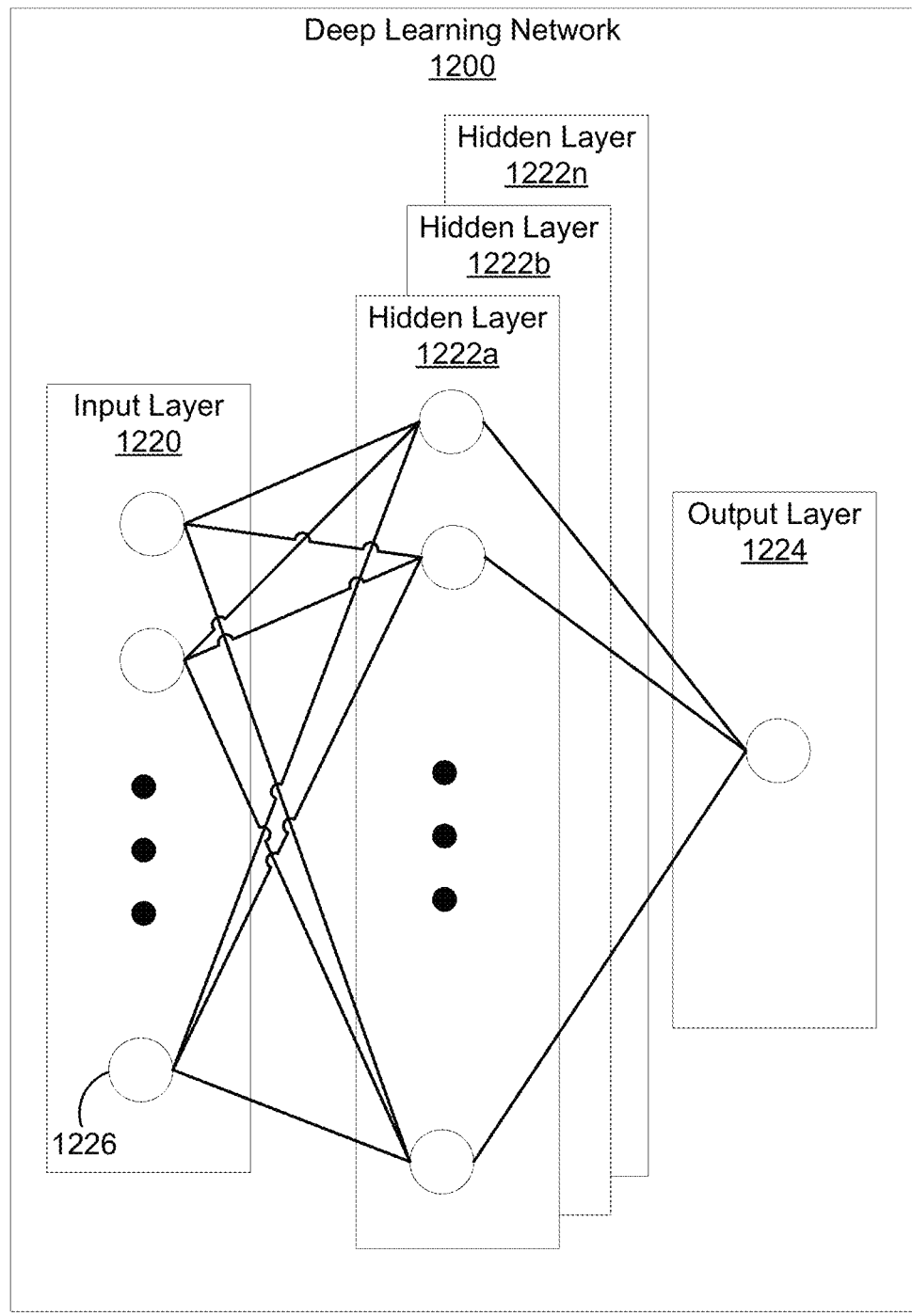
FIG. 12 is a block diagram illustrating an example of a deep learning network, in accordance with some examples.

FIG. 12 is an illustrative example of a deep learning neural network 1200 that can be used by the segmentation engine 104. An input layer 1220 includes input data. In one illustrative example, the input layer 1220 can include data representing the pixels of an input image, such as a short exposure image. The deep learning network 1200 includes multiple hidden layers 1222a, 1222b, through 1222n. The hidden layers 1222a, 1222b, through 1222n include "n" number of hidden layers, where "n" is an integer greater than or equal to one. The number of hidden layers can be made to include as many layers as needed for the given application. The deep learning network 1200 further includes an output layer 1224 that provides an output resulting from the processing performed by the hidden layers 1222a, 1222b, through 1222n. In one illustrative example, the output layer 1224 can provide data representing the pixels of an output image, such as a reduced-noise short exposure image.

The deep learning network 1200 is a multi-layer neural network of interconnected nodes. Each node can represent a piece of information. Information associated with the nodes is shared among the different layers and each layer retains information as information is processed. In some cases, the deep learning network 1200 can include a feed-forward network, in which case there are no feedback connections where outputs of the network are fed back into itself. In some cases, the network 1200 can include a recurrent neural network, which can have loops that allow information to be carried across nodes while reading in input.

Information can be exchanged between nodes through node-to-node interconnections between the various layers. Nodes of the input layer 1220 can activate a set of nodes in the first hidden layer 1222a. For example, as shown, each of the input nodes of the input layer 1220 is connected to each of the nodes of the first hidden layer 1222a. The nodes of the hidden layers 1222a-n can transform the information of each input node by applying activation functions to these information. The information derived from the transformation can then be passed to and can activate the nodes of the next hidden layer 1222b, which can perform their own designated functions. Example functions include convolutional, up-sampling, data transformation, and/or any other suitable functions. The output of the hidden layer 1222b can then activate nodes of the next hidden layer, and so on. The output of the last hidden layer 1222n can activate one or more nodes of the output layer 1224, at which an output is provided. In some cases, while nodes (e.g., node 1226) in the deep learning network 1200 are shown as having multiple output lines, a node has a single output and all lines shown as being output from a node represent the same output value.

In some cases, each node or interconnection between nodes can have a weight that is a set of parameters derived from the training of the deep learning network 1200. For example, an interconnection between nodes can represent a piece of information learned about the interconnected nodes. The interconnection can have a tunable numeric weight that can be tuned (e.g., based on a training dataset), allowing the deep learning network 1200 to be adaptive to inputs and able to learn as more and more data is processed.

The deep learning network 1200 is pre-trained to process the features from the data in the input layer 1220 using the different hidden layers 1222a, 1222b, through 1222n in order to provide the output through the output layer 1224. In an example in which the deep learning network 1200 is used to perform noise reduction, the network 1200 can be trained using training data that includes both input images with noise and corresponding output images without noise or with reduced noise. For instance, the network 1200 can be trained by inputting multiple noisy versions of images together with clean versions of the same images. Using the known inputs (noisy images) and the known outputs (clean images), a denoising neural network can tune its parameters (e.g., weights, biases, etc.) to be able to output clean images (the noise-reduced images) from noisy images that are input into the neural network at run-time.

In some cases, the deep neural network 1200 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 1200 is trained well enough so that the weights of the layers are accurately tuned.

For the example of denoising images, the forward pass can include passing a training image through the network 1200. The weights are initially randomized before the deep neural network 1200 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 1200, the output will likely include values that do not provide quality noise reduction due to the weights being randomly selected at initialization. With the initial weights, the network 1200 is unable to reduce or remove noise in the input training images. A loss function can be used to analyze error in the output. Any suitable loss function definition can be used. One example of a loss function includes a mean squared error (MSE). The MSE is defined as $$w = w_i - \eta \frac{dL}{dW},$$

which calculates the sum of one-half times the actual answer minus the predicted (output) answer squared. The loss can be set to be equal to the value of $E_{total}$.

The loss (or error) will be high for the initial training images since the actual values will be much different than the predicted output. The goal of training is to minimize the amount of loss so that the predicted output is the same as the training label. The deep learning network 1200 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The deep learning network 1200 can include any suitable deep network. One example includes a convolutional neural network (CNN), which includes an input layer and an output layer, with multiple hidden layers between the input and out layers. The hidden layers of a CNN include a series of convolutional layers, and can also include one or more of nonlinear, pooling (for downsampling), and fully connected layers. The deep learning network 1200 can include any other deep network other than a CNN, such as an autoencoder, a deep belief nets (DBNs), a Recurrent Neural Networks (RNNs), among others.

Figure 13:
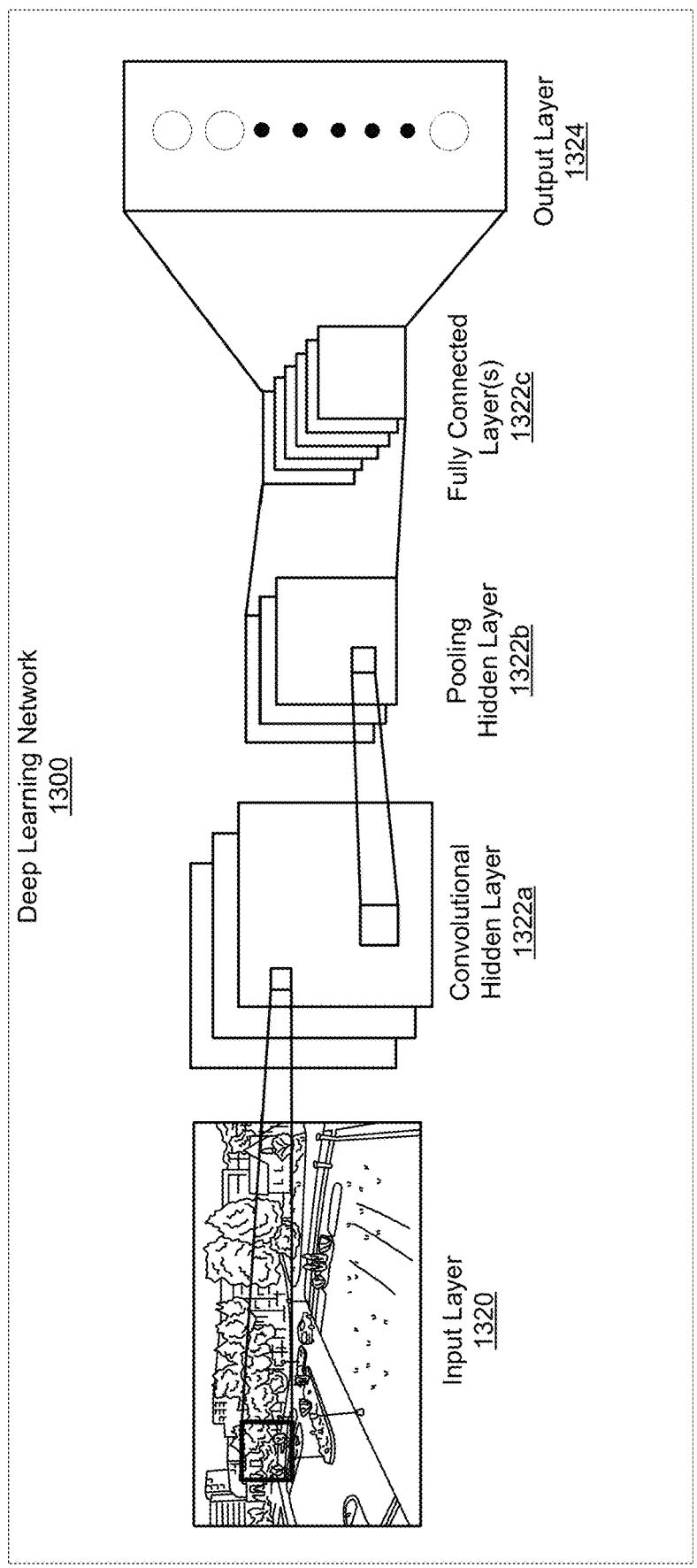
FIG. 13 is a block diagram illustrating an example of a convolutional neural network, in accordance with some examples.

FIG. 13 is an illustrative example of a convolutional neural network 1300 (CNN 1300). The input layer 1320 of the CNN 1300 includes data representing an image, such as a short exposure image (e.g., a captured short exposure image or a combined short exposure image generated by combining multiple captured short exposure images). For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1322a, an optional non-linear activation layer, a pooling hidden layer 1322b, and fully connected hidden layers 1322c to get an output at the output layer 1324. While only one of each hidden layer is shown in FIG. 13, one of ordinary skill will appreciate that multiple convolutional hidden layers, nonlinear layers, pooling hidden layers, and/or fully connected layers can be included in the CNN 1300. As previously described, the output can include data representing an output image (e.g., an array of numbers representing the pixels of the output image). For instance, the output image can include a noise-reduced short exposure image.

The first layer of the CNN 1300 is the convolutional hidden layer 1322a. The convolutional hidden layer 1322a analyzes the image data of the input layer 1320. Each node of the convolutional hidden layer 1322a is connected to a region of nodes (pixels) of the input image called a receptive field. The convolutional hidden layer 1322a can be considered as one or more filters (each filter corresponding to a different activation or feature map), with each convolutional iteration of a filter being a node or neuron of the convolutional hidden layer 1322a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1322a. Each connection between a node and a receptive field for that node learns a weight and, in some cases, an overall bias such that each node learns to analyze its particular local receptive field in the input image. Each node of the hidden layer 1322a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1322a is due to each node of the convolutional layer being applied to its corresponding receptive field. For example, a filter of the convolutional hidden layer 1322a can begin in the top-left corner of the input image array and can convolve around the input image. As noted above, each convolutional iteration of the filter can be considered a node or neuron of the convolutional hidden layer 1322a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1322*a*. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1322*a*.

The mapping from the input layer to the convolutional hidden layer 1322*a* is referred to as an activation map (or feature map). An activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1322*a* can include several activation maps in order to identify multiple features in an image. The example shown in FIG. 13 includes three activation maps. Using three activation maps, the convolutional hidden layer 1322*a* can detect three different kinds of features, with each feature being detectable across the entire image.

In some examples, a non-linear hidden layer can be applied after each convolutional hidden layer. For example, a non-linear hidden layer can be applied after the convolutional hidden layer 1322*a*. The non-linear layer can be used to introduce non-linearity to a system that computes linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 1300 without affecting the receptive fields of the convolutional hidden layer 1322*a*.

In some cases, pooling layers can be applied. For example, the pooling hidden layer 1322*b* can be applied after the convolutional hidden layer 1322*a* (and after the non-linear hidden layer when used). The pooling hidden layer 1322*b* is used to simplify the information in the output from the convolutional hidden layer 1322*a*. For example, the pooling hidden layer 1322*b* can take each activation map output from the convolutional hidden layer 1322*a* and generate a condensed activation map (or feature map) using a pooling function. Max-pooling is one example of a function performed by a pooling hidden layer. Other forms of pooling functions can be used by the pooling hidden layer 1322*a*, such as average pooling, L2-norm pooling, or other suitable pooling functions. A pooling function (e.g., a max-pooling filter, an L2-norm filter, or other suitable pooling filter) is applied to each activation map included in the convolutional hidden layer 1322*a*. In the example shown in FIG. 13, three pooling filters are used for the three activation maps in the convolutional hidden layer 1322*a*.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1322*a*. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1322*a* having a dimension of 24×24 nodes, the output from the pooling hidden layer 1322*b* will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1300.

The final layer of connections in the CNN 1300 is a fully-connected layer that connects every node from the pooling hidden layer 1322*b* to every one of the output nodes in the output layer 1324. Using the example above, the input layer includes 28×28 nodes encoding the pixel intensities of the input image, the convolutional hidden layer 1322*a* includes 3×24×24 hidden feature nodes based on application of a 5×5 local receptive field (for the filters) to three activation maps, and the pooling layer 1322*b* includes a layer of 3×2×12 hidden feature nodes based on application of max-pooling filter to 2×2 regions across each of the three feature maps. Extending this example, the output layer 1324 can include ten output nodes. In such an example, every node of the 3×12×12 pooling hidden layer 1322*b* is connected to every node of the output layer 1324.

The fully connected layer 1322*c* can obtain the output of the previous pooling layer 1322*b* (which should represent the activation maps of high-level features) and determines the features that most correlate to a particular class. For example, the fully connected layer 1322*c* layer can determine the high-level features that most strongly correlate to a particular class, and can include weights (nodes) for the high-level features. A product can be computed between the weights of the fully connected layer 1322*c* and the pooling hidden layer 1322*b* to obtain probabilities for the different classes.

In some examples, the hidden layers of the denoising neural network can include only convolutional layers (and possibly a non-linear layer after each convolutional layer), in which case pooling layers and fully connected layers are not included. In some cases, instead of pooling, the denoising neural network can perform re-shaping at the input and can perform an inverse of the re-shaping at the output. The re-shaping can take the input image and split it into multiple planes or images, such as four planes or images. For instance, the input image can be broken up into 4-pixel blocks, and each pixel in a 4-pixel block can be put into separate planes. Each of the planes can be run through the convolutional layers separately. At the output, the pixels can be put back into their original arrangement. Such a mechanism can allow the neural network to run efficiently and quickly, which is helpful on power-limited devices (e.g., mobile devices).

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing one or more low light images, the method comprising:
    obtaining at least one short exposure image, the at least one short exposure image being associated with one or more shutter speeds;
    obtaining at least one long exposure image, the at least one long exposure image being captured using a slower shutter speed than the one or more shutter speeds associated with the at least one short exposure image;
    mapping color information from the at least one long exposure image to the at least one short exposure image by determining color-matched output values for pixels of the at least one short exposure image, a color-matched output value for a pixel in a short exposure image being determined by modifying a pixel value of the pixel in the short exposure image using one or more statistical representations of color values of the pixels of a long exposure image; and
    generating an output image including the color-matched output values for the pixels of the at least one short exposure image.

2. The method of claim 1, wherein mapping the color information from the at least one long exposure image to the at least one short exposure image includes applying an affine transform to the at least one short exposure image, the affine transform mapping the one or more statistical representations of the color values of the pixels of the long exposure image and one or more statistical representations of color values of the pixels of the short exposure image.

3. The method of claim 2, wherein the one or more statistical representations of the color values of the pixels of the long exposure image and the one or more statistical representations of the color values of the pixels of the short exposure image are included in a three-dimensional tensor, the method further comprising applying one or more three-dimensional filters to the three-dimensional tensor.

4. The method of claim 2, wherein the affine transform includes mean-variance matching, wherein the one or more statistical representations of the color values of the pixels of the short exposure image include a mean and a variance of the color values of the pixels of the short exposure image, and wherein the one or more statistical representations of the color values of the pixels of the long exposure image include a mean and a variance of the color values of the pixels of the long exposure image.

5. The method of claim 4, further comprising generating a three-dimensional tensor, the three-dimensional tensor including a plurality of cells, each cell including at least one mean of a group of pixels from the short exposure image, at least one standard deviation of the group of pixels from the short exposure image, at least one mean of a group of pixels from the long exposure image, and at least one standard deviation of the group of pixels from the long exposure image.

6. The method of claim 5, wherein the three-dimensional tensor includes a plurality of layers of cells, and wherein each layer of the three-dimensional tensor corresponds to a different range of luminance values.

7. The method of claim 1, wherein the at least one short exposure image is single image captured using a shutter speed.

8. The method of claim 1, wherein the at least one short exposure image is a noise-reduced short exposure image generated from one or more short exposure images captured using the one or more shutter speeds, and wherein mapping the color information from the at least one long exposure image to the at least one short exposure image includes mapping the color information from the at least one long exposure image to the noise-reduced short exposure image.

9. The method of claim 8, further comprising:
generating the noise-reduced short exposure image, wherein generating the noise-reduced short exposure image includes processing the one or more short exposure images using a neural network trained to remove noise from the one or more short exposure images.

10. The method of claim 1, further comprising:
receiving a plurality of short exposure images captured using the one or more shutter speeds; and
generating an averaged short exposure image, wherein generating the averaged short exposure image includes averaging pixels from the plurality of short exposure images.

11. The method of claim 10, wherein the short exposure image is a noise-reduced short exposure image generated from the averaged short exposure image, and wherein mapping the color information from the at least one long exposure image to the at least one short exposure image includes mapping the color information from the at least one long exposure image to the noise-reduced short exposure image.

12. The method of claim 11, further comprising:
generating the noise-reduced short exposure image, wherein generating the noise-reduced short exposure image includes processing the averaged short exposure image using a neural network trained to remove noise from the averaged short exposure image.

13. A method of processing one or more low light images, the method comprising:
obtaining one or more short exposure images, the one or more short exposure images being captured using one or more shutter speeds;
generating a noise-reduced short exposure image from the one or more short exposure images;
obtaining a long exposure image, the long exposure image being captured using a slower shutter speed than the one or more shutter speeds used to capture the one or more short exposure images;
mapping color information from the long exposure image to the noise-reduced short exposure image by determining color-matched output values for pixels of the noise-reduced short exposure image, a color-matched output value for a pixel in the noise-reduced short exposure image being determined by modifying a pixel value of the pixel in the noise-reduced short exposure image using one or more statistical representations of color values of the pixels of the long exposure image; and
generating an output image including the color-matched output values for the pixels of the noise-reduced short exposure image.

14. An apparatus for processing one or more low light images, comprising:
a memory configured to store data corresponding to one or more short exposure images and data corresponding to one or more long exposure images; and
a processor configured to:
obtain at least one short exposure image, the at least one short exposure image being associated with one or more shutter speeds;
obtain at least one long exposure image, the at least one long exposure image being captured using a slower shutter speed than the one or more shutter speeds associated with the at least one short exposure image;
map color information from the at least one long exposure image to the at least one short exposure image by determining color-matched output values for pixels in the at least one short exposure image, a color-matched output value for a pixel in a short exposure image being determined by modifying a pixel value of the pixel in the short exposure image using one or more statistical representations of color values of the pixels in a long exposure image; and
generate an output image including the color-matched output values for the pixels of the at least one short exposure image.

15. The apparatus of claim 14, wherein mapping the color information from the at least one long exposure image to the at least one short exposure image includes applying an affine transform to the at least one short exposure image, the affine transform mapping the one or more statistical representations of the color values of the pixels in the long exposure image and one or more statistical representations of color values of the pixels in the short exposure image.

16. The apparatus of claim 15, wherein the one or more statistical representations of the color values of the pixels in the long exposure image and the one or more statistical representations of the color values of the pixels in the short exposure image are included in a three-dimensional tensor, and wherein the processor is further configured to apply one or more three-dimensional filters to the three-dimensional tensor.

17. The apparatus of claim 15, wherein the affine transform includes mean-variance matching, wherein the one or more statistical representations of the color values of the pixels in the short exposure image include a mean and a variance of the color values of the pixels in the short exposure image, and wherein the one or more statistical representations of the color values of the pixels in the long exposure image include a mean and a variance of the color values of the pixels in the long exposure image.

18. The apparatus of claim 17, wherein the processor is further configured to generate a three-dimensional tensor, the three-dimensional tensor including a plurality of cells, each cell including at least one mean of a group of pixels from the short exposure image, at least one standard deviation of the group of pixels from the short exposure image, at least one mean of a group of pixels from the long exposure image, and at least one standard deviation of the group of pixels from the long exposure image.

19. The apparatus of claim 18, wherein the three-dimensional tensor includes a plurality of layers of cells, and wherein each layer of the three-dimensional tensor corresponds to a different range of luminance values.

20. The apparatus of claim 14, wherein the at least one short exposure image is single image captured using a shutter speed.

21. The apparatus of claim 14, wherein the at least one short exposure image is a noise-reduced short exposure image generated from one or more short exposure images captured using the one or more shutter speeds, and wherein mapping the color information from the at least one long exposure image to the at least one short exposure image includes mapping the color information from the at least one long exposure image to the noise-reduced short exposure image.

22. The apparatus of claim 21, wherein the processor is further configured to:
generate the noise-reduced short exposure image, wherein generating the noise-reduced short exposure image includes processing the one or more short exposure images using a neural network trained to remove noise from the one or more short exposure images.

23. The apparatus of claim 14, wherein the processor is further configured to:
receive a plurality of short exposure images captured using the one or more shutter speeds; and
generate an averaged short exposure image, wherein generating the averaged short exposure image includes averaging pixels from the plurality of short exposure images.

24. The apparatus of claim 23, wherein the short exposure image is a noise-reduced short exposure image generated from the averaged short exposure image, and wherein mapping the color information from the at least one long exposure image to the at least one short exposure image includes mapping the color information from the at least one long exposure image to the noise-reduced short exposure image.

25. The apparatus of claim 24, wherein the processor is further configured to:
generate the noise-reduced short exposure image, wherein generating the noise-reduced short exposure image includes processing the averaged short exposure image using a neural network trained to remove noise from the averaged short exposure image.

26. The apparatus of claim 14, wherein the apparatus comprises a mobile device.

27. The apparatus of claim 26, further comprising one or more cameras for capturing the one or more short exposure images and the one or more long exposure images.

28. The apparatus of claim 27, further comprising a display for displaying the output image.

29. An apparatus for processing one or more low light images, comprising:
a memory configured to store data corresponding to one or more short exposure images and data corresponding to one or more long exposure images; and
a processor configured to:
obtain one or more short exposure images, the one or more short exposure images being captured using one or more shutter speeds;
generate a noise-reduced short exposure image from the one or more short exposure images;
obtain a long exposure image, the long exposure image being captured using a slower shutter speed than the one or more shutter speeds used to capture the one or more short exposure images;
map color information from the long exposure image to the noise-reduced short exposure image by determining color-matched output values for pixels of the noise-reduced short exposure image, a color-matched output value for a pixel in the noise-reduced short exposure image being determined by modifying a pixel value of the pixel in the noise-reduced short exposure image using one or more statistical representations of color values of the pixels of the long exposure image; and
generating an output image including the color-matched output values for the pixels of the noise-reduced short exposure image.

30. The apparatus of claim 29, wherein the apparatus comprises a mobile device, the mobile device including:
one or more cameras for capturing the one or more short exposure images and the one or more long exposure images; and
a display for displaying the output image.

* * * * *